(12) United States Patent
Tanaka et al.

(10) Patent No.: US 7,577,361 B2
(45) Date of Patent: Aug. 18, 2009

(54) OPTICAL NETWORK SYSTEM AND OPTICAL COUPLING APPARATUS

(75) Inventors: Toshiki Tanaka, Kawasaki (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 634 days.

(21) Appl. No.: 10/914,192

(22) Filed: Aug. 10, 2004

(65) Prior Publication Data

US 2005/0207756 A1 Sep. 22, 2005

(30) Foreign Application Priority Data

Mar. 22, 2004 (JP) .............................. 2004-082881

(51) Int. Cl.
*H04J 14/02* (2006.01)

(52) U.S. Cl. ...................................................... 398/69

(58) Field of Classification Search ................... 398/69
See application file for complete search history.

(56) References Cited

U.S. PATENT DOCUMENTS

| | | | | | |
|---|---|---|---|---|---|
| 5,077,728 | A | * | 12/1991 | Kaminow | 398/89 |
| 5,274,487 | A | * | 12/1993 | Fujimoto et al. | 398/50 |
| 5,414,548 | A | | 5/1995 | Tachikawa et al. | |
| 5,450,224 | A | * | 9/1995 | Johansson | 398/50 |
| 5,694,499 | A | | 12/1997 | Tillerot et al. | 385/24 |
| 5,724,167 | A | | 3/1998 | Sabella | 398/50 |
| 5,889,600 | A | * | 3/1999 | McGuire | 398/50 |
| 5,963,350 | A | * | 10/1999 | Hill | 398/70 |
| 6,385,206 | B1 | | 5/2002 | Nakata | |
| 6,404,940 | B1 | * | 6/2002 | Tsuyama et al. | 385/17 |
| 6,414,766 | B1 | * | 7/2002 | Vinel et al. | 398/45 |
| 6,959,128 | B2 | * | 10/2005 | Castanon et al. | 385/16 |
| 2001/0024305 | A1 | * | 9/2001 | Nishimoto | 359/128 |
| 2003/0147645 | A1 | * | 8/2003 | Imajuku et al. | 398/7 |
| 2003/0193955 | A1 | * | 10/2003 | Beshai | 370/395.4 |
| 2003/0194175 | A1 | * | 10/2003 | Beshai et al. | 385/24 |

FOREIGN PATENT DOCUMENTS

| | | |
|---|---|---|
| JP | 3-57333 | 3/1991 |
| JP | 6-350563 | 12/1994 |
| JP | 7-098424 | 4/1995 |
| JP | 7-107113 | 4/1995 |
| JP | 8-242208 | 9/1996 |
| JP | 9-018596 | 1/1997 |
| JP | 9-261243 | 10/1997 |
| JP | 11-112473 | 4/1999 |
| JP | 2000-500314 | 1/2000 |
| JP | 2001-326610 | 11/2001 |
| JP | 2002-152784 | 5/2002 |
| WO | WO 0137472 A1 * | 5/2001 |

OTHER PUBLICATIONS

Notice for Reason of Rejection mailed on Sep. 16, 2008 in relation to Japanese Patent Application No. 2004-082881.

* cited by examiner

*Primary Examiner*—Leslie Pascal
(74) *Attorney, Agent, or Firm*—Staas & Halsey LLP

(57) ABSTRACT

In the optical network system, light input to any of the optical input ports of the optical coupler is converted into light at another wavelength via a variable-wavelength optical receiver and an optical sender, and is then reinput to the optical coupler. This arrangement makes it possible to realize a full-mesh optical network system with a simple construction at low costs.

13 Claims, 16 Drawing Sheets

OPTICAL NETWORK SYSTEM AND OPTICAL COUPLING APPARATUS

BACKGROUND OF THE INVENTION

1. Field of the Invention

The present invention relates to an optical network system and an optical coupling apparatus. The invention particularly relates to a technique suitable for use in connecting optical communication devices (modules), provided for servers and databases, as a full mesh via an optical path in an optical network system in which WDM (Wavelength Division Multiplex) technology is employed.

2. Description of the Related Art

Networks, such as LANs (Local Area Networks), which transmit electric signals therein have recently been built, and from the viewpoints of recent increasing network capacity (speeding up of transfer signals) and network expansion, networks, such as optical LANs, which transmit light signals therein have started to be constructed. Under such circumstances, WDM technology, in which multiple signals are multiplexed in a single communication path, or an optical fiber, without causing any crosstalk, has been regarded as an up-and-coming technology due to its large capacity, high extensibility, and high confidentiality.

(1) Examples of Optical Networks (1.1) WDM Star Network

FIG. 9 shows an example of a previous optical network system employing WDM technology, which network system includes two or more servers and databases. Common types of network topology are a bus, star, and ring type, and the following description will be made of a network with a star topology.

In the star network of FIG. 9, light signals at different wavelengths of $\lambda 1$ through $\lambda n$ (n is an integer greater than 2) are output from optical senders (E/O) 101 provided, one for each communication device such as a server, of the first section 100, and multiplexed by an N×M (N and M are integers greater than 2) optical coupler (star coupler) 200, and then split in power. The light signals pass through wavelength-selective optical filters 300, each of which selectively transmits a predetermined fixed wavelength, and are then received by optical receivers (O/E) 401 provided (connected), one for each communication device of the second section 400, for each wavelength $\lambda i$ (i=1 through n).

Further, though not shown in FIG. 9, the same goes for when light signals are sent from the second section 400 to the first section 100. Light signals are output from optical senders (E/O) provided, one for each server of the second section 400, and then multiplexed and split in the N×M optical coupler. After that, the signals pass through wavelength-selective optical filters, each of which selectively transmits a to-be-received wavelength, and are then received by optical receivers (O/E) provided, one for each communication device of the first section 100, for each wavelength.

An optical network with such a construction is disclosed also in the following patent document 5. Further, in the above example, wavelength selection is performed by the N×M optical coupler 200 and the wavelength-selective optical filters 300 in combination, and this function can also be implemented by the combination of an N×1 multiplexer 201 and a 1×M demultiplexer 202, both of which are wavelength-selective, as shown in FIG. 10. These N×1 multiplexer 201 and 1×M demultiplexer 202 are interconnected with each other via an optical fiber, with an optical amplifier 203 interposed therebetween, if necessary, depending on a transmission distance therebetween.

Since this arrangement simplifies a network construction, the extensibility of the network is increased, and it becomes easy to send the same signal to different destinations at the same time. However, partly since light sources provided, one for each optical sender 101, have fixed oscillation wavelengths, and partly since each wavelength-selective optical filter 300 on the receiver end has a fixed central transmission wavelength, it is impossible to change light signal paths after they have been determined once.

(1.2) Network Employing the Technology of Adding ID Information to Signals

A construction for realizing full-mesh connections in such an optical network has already been proposed. For example, as shown in FIG. 11, adding ID information to signals electrically realizes a full-mesh network.

In the network of FIG. 11, for example, a light signal output from an optical sender 101 of the #i-th port is multiplexed with light signals output from other optical senders 101 in the N×M optical coupler 200, and is then broadcast to two or more output ports. At that time, since the light signals contain ID information electrically added thereto, each optical receiver 401 is capable of recognizing whether or not to receive those signals, so that only a necessary signal can be received by the individual optical receivers 401. In addition, since signals simultaneously sent out from different input ports of the N×M optical coupler 200 enhance interference between signals, signal transmission is performed on the input ports with different timing.

(1.3) Network Including Variable-Wavelength Optical Receivers

WDM technology can also be used for realizing flexible path switching to establish full-mesh networks. FIG. 12 illustrates an example of an optical network including variable-wavelength optical receivers. In the optical network of FIG. 12, WDM signals at wavelengths of $\lambda 1$ through $\lambda n$ are multiplexed and split by the N×M optical coupler 200, and output from each output port. Each variable-wavelength optical filter 301 is set so as to have a central transmission wavelength equal to the wavelength to be received by each optical receiver 401, thereby transmitting only a required signal which is then received by the optical receiver 401. Here, signal paths can be set in a flexible manner by changing the central transmission wavelength of the variable-wavelength optical filter 301. In this instance, use of such variable-wavelength filters on the receiver ends is proposed in the following patent document 4.

(1.4) Optical Network Including Variable-Wavelength Optical Senders

FIG. 13 shows an optical network including variable-wavelength optical senders. In the network of FIG. 13, each optical sender 102 has a variable-wavelength light source (LD) whose wavelength can be varied from $\lambda 1$ to $\lambda n$, and the oscillation wavelength of the light source is set at the same wavelength as that of its destination receiver. As a result, the light signal from each optical sender 102 is multiplexed and split in the N×M optical coupler 200, and then passes through each fixed-wavelength selective optical filter 300 to be received by the corresponding optical receiver (the aforementioned destination receiver) 401. Here, signal path setting can be performed in a flexible manner by changing the wavelength of the variable-wavelength light source provided for each optical sender 102.

(1.5) Network Including a Wavelength Converting Device

FIG. 14 shows an optical network including a wavelength converting device which converts light signals in wavelength, from an arbitrary wavelength into a desired wavelength. In the network of FIG. 14, a light signal sent from an optical sender

101 at a wavelength of λj is multiplexed, in the multiplexer 201, with light signals output from other optical senders 101, and then input to the wavelength converting device 500 to be converted into a wavelength to be received. The light signals having been converted into receive wavelengths are demultiplexed by a wavelength-selective demultiplexer 202 and then received by desired optical receivers 401. Here, signal paths can be set in a flexible manner by changing conversion wavelength settings of the wavelength converting device 500. However, because of non-linearity utilized in the wavelength conversion, realizing the wavelength converting device 500 requires a high level of technology in terms of conversion efficiency, conversion band, device size, and so on.

(1.6) Network Including an Optical Switch

FIG. 15 illustrates an optical network employing an optical switch. In the network of FIG. 15, light signals output from different ports (optical senders 101) are input to a (multiple ports)×(multiple ports) optical switch 600. The optical switch 600 includes MEMS (Micro Electro Mechanical Systems) mirrors prepared, one for each port, with which mirrors optical paths to optical receivers 401 are set to make desired optical receivers receive the corresponding signals. Here, signal paths can be determined in a flexible manner by changing the setting of the optical switch 600.

(1.7) Optical Network Including a Continuous Circulation Coupler

FIG. 16 shows an example of an optical network including a continuous circulation coupler. In the network of FIG. 16, input ports (input channels; 5 ports (channels) in this example) of continuous circulation coupler [AWG (Arrayed Waveguide Grating) router] 700 and their wavelengths are connected to output ports (output channels; 5 ports (channels) in this example) thereof and their wavelengths in a one-to-one relationship, in accordance with certain rules (continuous wavelength circulation). Five signals being multiplexed are input to the 5 input ports of the coupler 700 and also output from the 5 output ports thereof as 5 signals being multiplexed. Accordingly, this technique makes it possible to select network paths by changing the wavelengths input to the ports, so that an all-optical network can be realized (detailed in the following patent document 1).

Further, the following patent documents 2 and 6 propose an optical cross connect device formed by an optical coupler, variable-wavelength filters, and a wavelength converter. This technology makes it possible to switch multiple optical channels among multiple ports. Further, the following patent document 3 proposes an optical cross connect device which can perform signal switching for each channel or for each channel group, for use in a WDM network including an optical switch, coupler, and feedback loop.

[Patent Document 1] Japanese Patent Application Publication No. 2001-326610

[Patent Document 2] U.S. Pat. No. 5,694,499

[Patent Document 3] Japanese Patent Application Publication No. 2002-152784

[Patent Document 4] Japanese Patent Application Publication No. HEI 3-57333

[Patent Document 5] Japanese Patent Application Publication No. HEI 9-261243

[Patent Document 6] Published Japanese Translation of PCT International Publication for Patent Application No. HEI 2000-500314

However, electric signal-employed optical networks are disadvantageous in that the size of networks that can be established as a full-mesh is limited, from the viewpoints of crosstalk, reflection, power consumption, and so on. Further, if the optical networks shown in the previous technologies are formed of a light source with a fixed oscillation wavelength and wavelength-selective optical filters, each having a fixed central transmission wavelength, the networks can be realized at low cost. However, in that case, path settings (optical link settings) are uniquely determined, so that realizing a full-mesh construction resultantly becomes difficult.

Further, even if full-mesh networks are realized by the foregoing previous technologies, there still are problems as follows.

(a) Adding Electric ID Information to Signals (See FIG. 11):

In this case, time-based exclusive processing is required, so that signals can only be sent one by one. Thus, with an increased number of ports, the processing becomes very time-consuming. In addition, as the ID information is added electrically, load on electric circuitry will be increased.

(b) Applying Variable-Wavelength Optical Receivers and Optical Senders (See FIG. 12 and FIG. 13):

Variable-wavelength optical receivers and optical senders need to be provided for all the input and output ports, so the networks becomes expensive.

(c) Applying a Wavelength Converting Device (See FIG. 14):

As has already been described, non-linearity is utilized in wavelength conversion, so that a high level of technology is required to realize a good conversion efficiency, conversion band, and device size, thereby increasing costs and network size.

(d) Applying an Optical Switch (See FIG. 15):

When using MEMS mirrors, mechanical control, namely, mirror angle control, needs to be performed, so that high-speed switching is technically difficult. In addition, the technique cannot cope with an increased number of ports.

(e) Applying a Continuous Circulation Coupler (FIG. 16):

Since variable-wavelength optical senders or a switch for switching input and output ports is required, the network becomes greatly expensive.

In view of these, by using previous technologies including the above patent documents 1 through 6, it is difficult to realize full-mesh optical networks with simple construction at reasonable cost.

SUMMARY OF THE INVENTION

With the foregoing problems in view, it is an object of the present invention to provide a reasonable full-mesh optical network system having a simple construction.

In order to accomplish the above object, according to the present invention, there is provided an optical network system, comprising: a plurality of optical senders including one or more fixed-wavelength optical senders and one or more variable-wavelength optical senders; a plurality of optical receivers including one or more fixed-wavelength optical receivers and one or more variable-wavelength optical receivers; and optical coupling means having a plurality of optical input ports, to which light is input from the individual optical senders, and a plurality of optical output ports, from which the light is output to the individual optical receivers. The optical coupling means selectively outputting a wavelength of light, received through each of the input ports, to one of the optical receivers, depending on the wavelength of light. Either the variable-wavelength optical receiver or the variable-wavelength optical sender converts such input light, input to one of the optical input ports, into another wavelength of light and reinputs the resultant light to the optical coupling means.

As one preferred feature, the variable-wavelength optical receiver is adapted to convert the received light into an electric signal and input the electric signal to the variable-wavelength optical sender, which converts the electric signal into light at the above-mentioned wavelength and reinputs the light into the optical coupling means.

As another preferred feature, the optical coupling means includes: a single n×m optical coupler, n being the number of the optical input ports, and m being the number of the output ports; a fixed-wavelength selector provided for each of the optical output ports, of the optical output ports of the optical coupler, connected to fixed-wavelength optical receivers, which fixed-wavelength selector selects a wavelength of light which is to be received by each of the fixed-wavelength optical receivers; and a variable-wavelength selector provided for each of the optical output ports, of the optical output ports of the optical coupler, connected to variable-wavelength optical receivers, which variable-wavelength selector selects a wavelength of light which is to be received by each of the variable-wavelength optical receivers.

As a further preferred feature, the optical network system further comprises a control means which controls transmission timing in the optical senders in such a manner that light at an identical wavelength is not simultaneously input from different ones of the optical senders to the optical coupling means.

As a generic feature, there is provided an optical coupling apparatus, comprising: an optical coupling means having a plurality of optical input ports and a plurality of optical output ports, which optical coupling means selectively outputs a wavelength of light, received through each of the input ports, from one of the output ports, depending on the wavelength of light; and a wavelength converting and reinputting means which converts light, passing through one of the optical input ports and one of the output ports, into another wavelength of light and reinputs the light at this wavelength to the optical coupling means.

According to the present invention, it is possible to select and change destination (optical link setting) of a light signal in a flexible manner, by preparing not all but some of the optical senders and receivers at the individual optical input and output ports as variable-wavelength-type, so that a full-mesh optical network system with a simple construction is realized at low cost.

Other objects and further features of the present invention will be apparent from the following detailed description when read in conjunction with the accompanying drawings.

DESCRIPTION OF THE PREFERRED EMBODIMENT(S)

[A] One Preferred Embodiment

Figure 1:
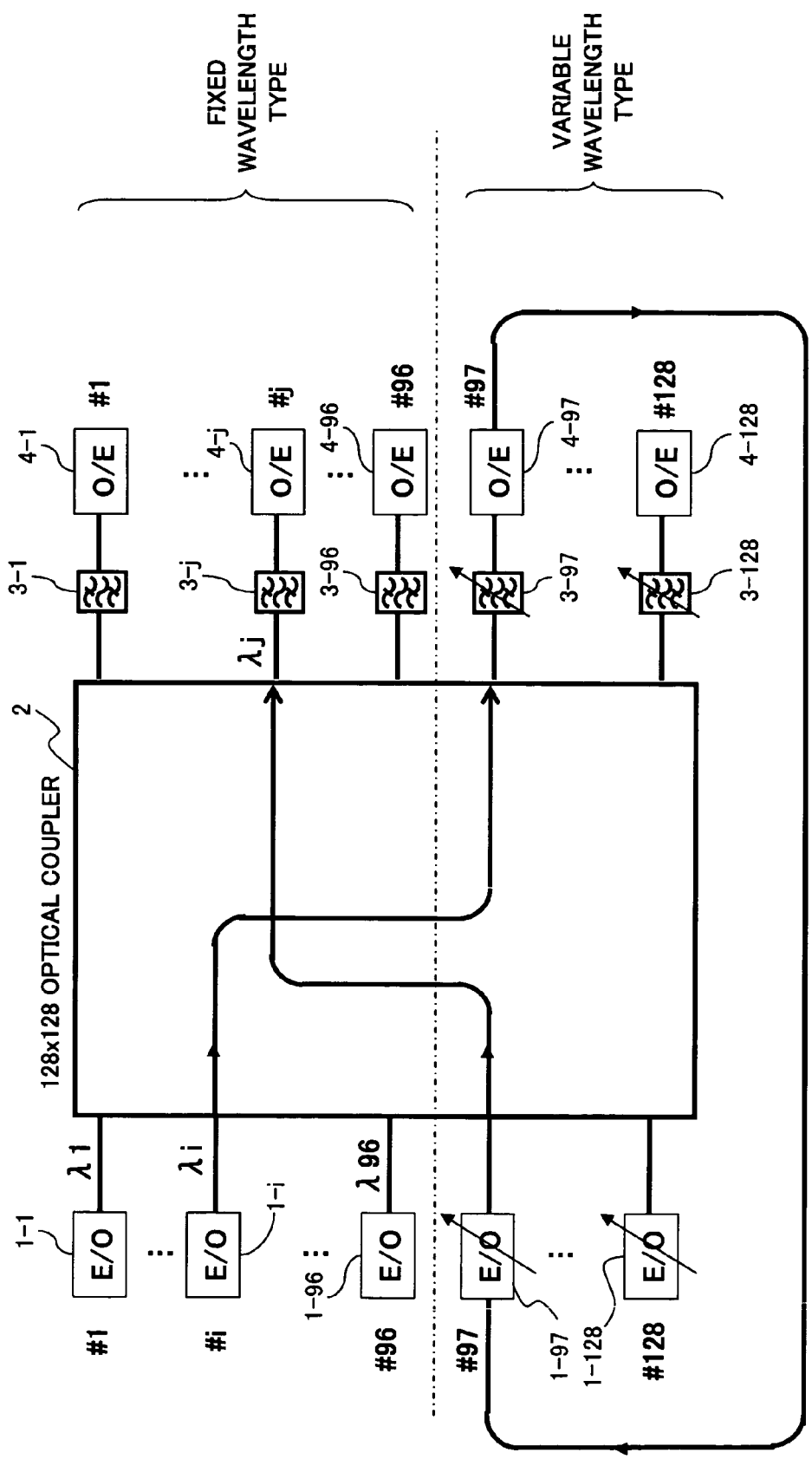
FIG. 1 is a block diagram showing a construction of an optical network system according to one preferred embodiment of the present invention.

FIG. 1 depicts a construction of an optical network system according to one preferred embodiment of the present invention. The system of FIG. 1 includes more than one (128 in this example) optical sender 1-1 through 1-128 with a function of electrical/optical (E/O) conversion, a 128×128 optical coupler 2, more than one (128) wavelength selective optical filter (wavelength selector) 3-1 through 3-128, and more than one (128) optical receiver 4-1 through 4-128 with a function of optical/electrical (O/E) conversion. In this example, these optical senders and optical receivers are provided for communication apparatus, such as servers, which form an optical network such as an optical LAN.

As shown in FIG. 1, of those optical senders, 1-1 through 1-128, some (32) optical senders, 1-97 through 1-128, are variable-wavelength optical senders, while the remaining 96 optical senders, 1-1 through 1-96, are fixed-wavelength optical senders. Further, of the above wavelength selective optical filters, 3-1 through 3-128, some (32) wavelength selective optical filters, 3-97 through 3-128, are variable-wavelength optical filters, while the remaining 96 wavelength selective optical filters, 3-1 through 3-96, are fixed-wavelength optical filters. Likewise, of the optical receivers, 4-1 through 4-128, some (32) optical receivers, 4-97 through 4-128, are variable-wavelength optical receivers, while the remaining 96 optical receivers, 4-1 through 4-96, are fixed-wavelength optical receivers.

The 32 variable-wavelength optical receivers, 4-97 through 4-128, and the 32 variable-wavelength optical senders, 1-97 through 1-128, are connected in a one-to-one relationship (FIG. 1 shows connection between the optical sender 1-97 and the optical receiver 4-97 alone, and other connections are omitted from illustration).

Here, each fixed-wavelength optical sender 1-J (J=1 through 96) sends light at a predetermined wavelength (for example, λJ), and each variable-wavelength optical sender 1-K (K=97 through 128) can change its transmit wavelength at least in a range of λ1 through λ96.

The 128×128 optical coupler 2, which has 128 optical input ports (port No.=#1 through #128) and 128 optical output ports (port No.=#1 through #128), multiplexes incoming light, input to its optical input ports from the 128 optical senders, 1-1 through 1-128, respectively, and then splits (the power of) the WDM light among the optical output ports.

Each fixed-wavelength selective optical filter (hereinafter also called a fixed filter) 3-J receives light output from its corresponding optical output port of the 128×128 optical coupler 2 and transmits only a predetermined wavelength of light. Here, a fixed-wavelength optical sender 1-J and a fixed-wavelength optical receiver 4-J, which should communicate with each other, and the fixed-wavelength-type wavelength selective optical filter 3-J, are given an identical central wavelength in order to make the fixed-wavelength optical sender 1-J and the fixed-wavelength optical receiver 4-J process light signals whose central wavelengths are the same.

Each variable-wavelength selective optical filter (hereinafter also called a tunable filter) 3-K is capable of changing its central transmission wavelength at least in a range of $\lambda 1$ through $\lambda 96$, and transmits only light having a selected central transmission wavelength, of the WDM signals output from the corresponding output port of the optical coupler 2.

That is, the 128×128 optical coupler 2 has optical input ports (#1 through #128) for receiving light from the optical senders, 1-1 through 1-128, and optical output ports (#1 through #128) for outputting the light to the optical receivers, 4-1 through 4-128. This 128×128 optical coupler 2 and the wavelength selective optical filters, 3-1 through 3-128, form an optical coupling means which selects from which output port a wavelength of light, received through each input port, should be output (to the corresponding optical receiver, 4-1 through 4-128), depending on the wavelength of light.

The optical receivers, 4-1 through 4-128, receive light signals that have passed through the corresponding wavelength selective optical filters, 3-1 through 3-128, and convert the light signals into electric signals, and then perform a predetermined receive processing. Here, an electric signal obtained by a variable-wavelength optical receiver 4-K is fedback to a variable-wavelength optical sender 1-K, which converts the feedback into another wavelength before it is reinput into the optical coupler 2.

That is, the variable-wavelength optical sender 1-K and the variable-wavelength optical receiver 4-K serves as a wavelength converting and reinputting means which converts light input to one of the input ports (light passing through one of the optical input ports and one of the output ports) into another wavelength of light and reinputs the converted light to the optical coupler 2. It is to be noted that a purpose of using an electric signal as the feedback is to ensure a required SNR (Signal to Noise Ratio) in a simple way, by performing relay and reproduction processing utilizing the electric signal on the variable-wavelength optical receiver 4-K and the variable-wavelength optical sender 1-K. Accordingly, a light signal can also be fedback as it is, without being converted into an electric signal, as long as such a required SNR is ensured.

A description will be made hereinbelow of an operation of an optical network system with the foregoing construction.

Consider a case where a light signal is sent from optical sender 1-i of the #i-th port, which is given a fixed wavelength of $\lambda i$ (i=1 through 96), to optical receiver 4-j of the #j-th port, which is given a fixed wavelength of $\lambda j$ (j=1 through 96).

In this example, light output from the optical sender 1-i of the #i-th port is combined with light output from other optical senders into WDM light and then split in power into each output port. At this time, if the tunable 3-97 of the #97th port is given a central transmission wavelength of $\lambda i$, the light signal at a wavelength of $\lambda i$ sent from the optical sender 1-i passes through the tunable 3-97 and enters the optical receiver 4-97 of the #97th port.

After that, the optical receiver 4-97 converts the light signal into an electric signal, which is then fedback to the optical sender 1-97 of the #97th port.

Here, if the optical sender 1-97 is given a central transmit wavelength of $\lambda j$, the above feedback signal is converted by the optical sender 1-97 from an electric form into a light signal at a wavelength of $\lambda j$, and then reinput to the optical coupler 2. As a result, the light signal at a wavelength of $\lambda j$ is multiplexed with light signals output from other optical senders once again and then split in power. After that, the fixed filter 3-j, whose central transmission wavelength is set to a wavelength of $\lambda j$, selects the light at a wavelength of $\lambda j$, which is then received by the optical receiver 4-j of the #j-th port.

In this manner, it is possible to send a light signal at a wavelength of $\lambda i$ output from the optical sender 1-i of the #i-th port to the optical receiver 4-j of the #j-th port which is given a wavelength of $\lambda j$.

According to the network configuration of FIG. 1, since the optical coupler 2 multiplexes different wavelengths of light, it is possible that light signals at an identical wavelength interfere with each other, thereby causing erroneous operation. Such interference (erroneous operation) can be avoided by the following control method.

Firstly, referring to FIG. 1, the control method will be described in a case where the fixed transmit wavelength of each optical sender 1-J differs from the fixed receive wavelength of each optical receiver 4-J.

As shown in FIG. 1, when transmitting light from the #i-th port for a wavelength of $\lambda i$ to the #j-th port for a wavelength of $\lambda j$, an unused port (port number 97 in FIG. 1) is selected among the ports (32 ports, #97 through #128) each of which is equipped with a variable-wavelength optical sender 1-K and a variable-wavelength optical receiver 4-K. After that, the optical receiver 4-97 (port number #97) is set so as to receive a wavelength of $\lambda i$, and the optical sender 1-97, which is paired with the optical receiver 4-97, is set so as to send a wavelength of $\lambda j$. In addition, other variable-wavelength optical receivers 4-K than the one at port No. #97 are set so as to have receive wavelengths other than $\lambda i$. Likewise, other variable-wavelength optical senders 1-K than the one at port No. #97 are set so as to send wavelengths other than $\lambda j$. Here, note that the above example relates to one-to-one communication.

In contrast to this, in order to realize broadcast (or multicast) communication, in which one sender end communicates with more than one receiver end, other optical receivers than the one at port No. #97 need to be so set as to have an identical receive wavelength of $\lambda i$, while other optical senders than the one at port No. #97 need to be so set as to have different transmit wavelengths. After completion of such setting, the optical sender 1-i of the #i-th port starts to transfer information to the optical receiver 4-j of the #j-th port. Such control makes it possible to transfer information from the input port No. #i to the output port No. #j via variable-wavelength input and output ports.

Next, referring to FIG. 1, a description will be made hereinbelow of a control method to be carried out when the fixed transmit wavelength of the optical sender 1-J and the fixed receive wavelength of the optical receiver 4-J are the same.

As shown in FIG. 1, when transferring light from the port for a wavelength of $\lambda i$ to another port for a wavelength of $\lambda j$, an unused port (port number #97 in FIG. 1) is selected among the ports to each of which a variable-wavelength optical sender 1-K and a variable-wavelength optical receiver 4-K are connected.

The optical receiver 4-97 of port No. #97 is set so as to receive a wavelength of $\lambda i$, and the optical sender 1-97 is set so as to send a wavelength of $\lambda i$. In addition, other variable-wavelength optical receivers 4-K than the one at port number #97 are set so as to have receive wavelengths other than $\lambda i$. Likewise, other variable-wavelength optical senders 1-K than the one with port number #97 are set so as to have transmit wavelengths other than $\lambda j$. In this instance, of the fixed-wavelength optical senders 1-J, the optical sender 1-$j$ of the #j-th port for a wavelength of $\lambda j$ is set so as not to perform outputting until information transfer from the port for a wavelength of $\lambda i$ to the port for a wavelength of $\lambda j$ is completed.

After completion of such setting, the optical sender 1-$i$ of the #i-th port starts to transfer information to the optical receiver 4-$j$ of the #j-th port. At that time, the light at a wavelength of $\lambda j$, output from the fixed-wavelength optical sender 1-$i$ of the #i-th port for a fixed-wavelength of $\lambda i$, enters the fixed-wavelength optical receiver 4-$i$, too, and the need or lack of need for the optical receiver 4-$i$ to receive the light is decided by a server (not shown) itself that has the optical receiver 4-$i$ of the #i-th port for a fixed wavelength of $\lambda i$.

Such control makes it possible to transfer information from the input port No. #i to the output port No. #j via variable-wavelength input and output ports.

In this manner, according to the present embodiment, instead of providing all the ports with variable-wavelength optical senders and receivers, most of the optical senders, 1-1 through 1-96, and most of the optical receivers, 4-1 through 4-96, are prepared as those of a fixed-wavelength type, and only some of the optical senders, 1-97 through 1-128, and some of the optical receivers, 4-97 through 4-128, are prepared as those of a variable-wavelength type. In order to realize flexible path setting for light signals at fixed wavelengths, signal paths are so set as to pass through the optical coupler 2 more than one time via variable-wavelength optical receivers 4-K and variable-wavelength optical senders 1-K. This arrangement realizes an optical link in which p (p=32 in this example) pairs of variable-wavelength optical senders 1-K and variable-wavelength optical receivers 4-K are connected as a full mesh, thereby providing a p×p full-mesh optical network system.

The number of ports, the number of optical senders, and the number of optical receivers are not limited to the foregoing ones but can also be changed as necessary.

(A1) First Modification:

The wavelength coupling function of the above 128×128 optical coupler 2 can also be realized by a 128×1 optical coupler (first optical coupler) 2-1 and a 1×128 optical coupler (second optical coupler) 2-2 in combination. More precisely, light signals from the optical senders, 1-1 through 1-128, are multiplexed by the 128×1 optical coupler 2-1 and then split in power by the 1×128 optical coupler 2-2. These couplers, 2-1 and 2-2, are interconnected via an optical fiber 5. Here, like reference numbers and characters designate similar parts or elements throughout several views of the present embodiment and the conventional art, so their detailed description is omitted here.

With this arrangement, as in the case of the above-described embodiment, it is possible to send a light signal from the optical sender 1-$i$ of the #i-th port for a wavelength of $\lambda i$ to the optical receiver 4-$j$ of the #j-th port for a wavelength of $\lambda j$. The signal flow and the control for avoiding interference are the same as those in the above-described system. Moreover, in the present modification, an optical amplifier can be interposed between the 128×1 optical coupler 2-1 and the 1×128 optical coupler 2-2 to compensate for losses caused by the optical couplers, 2-1 and 2-2.

Figure 3:
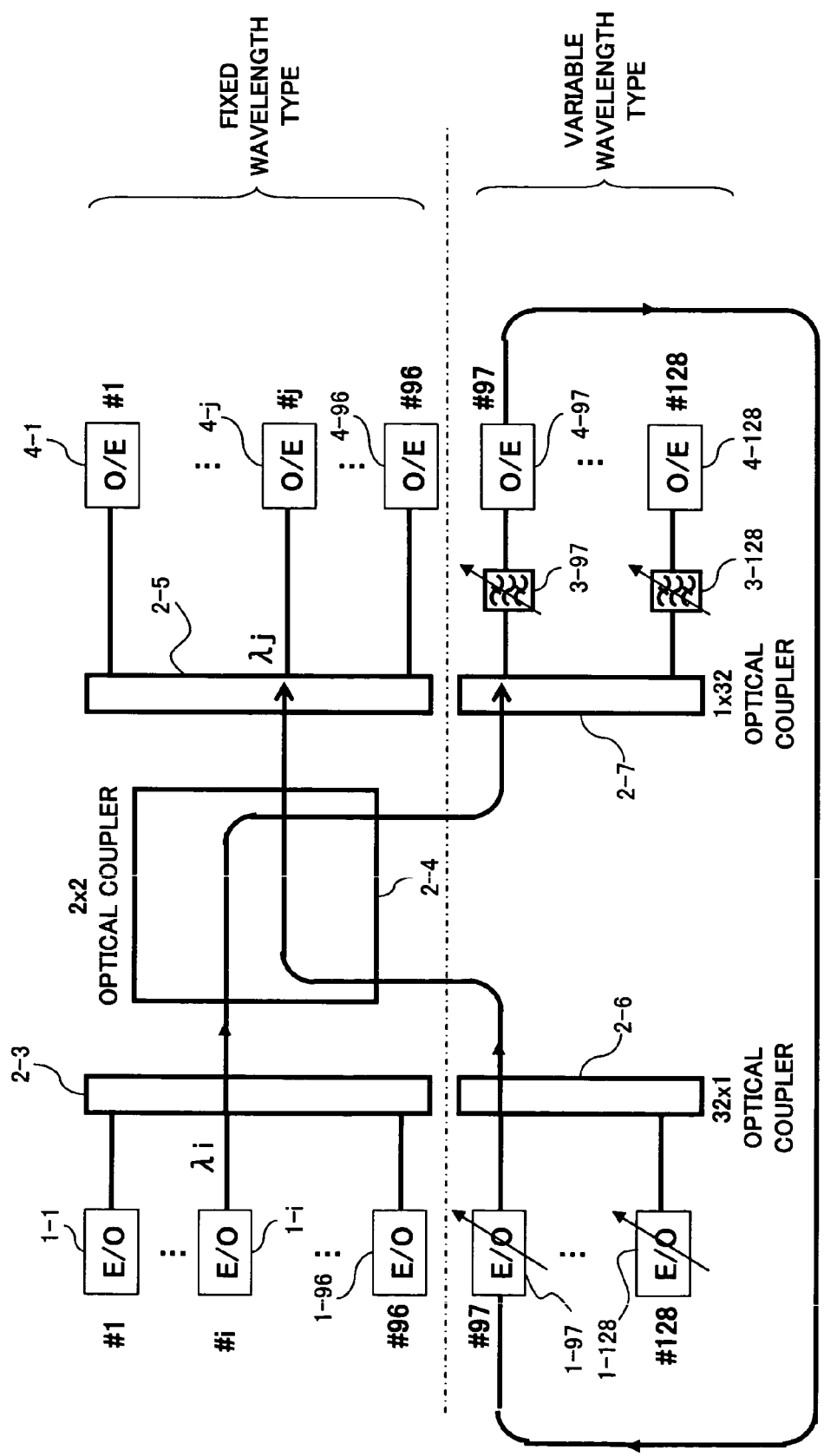
FIG. 3 is a block diagram showing a second modified example of the optical network system of FIG. 1.

(A2) Second Modification:

FIG. 3 depicts a second modified example of the optical network system already described referring to FIG. 1. The system of FIG. 3 differs from that of FIG. 1 in that, in place of a 128×128 optical coupler 2, it employs: a variable-wavelength multiplexer 2-3 and a variable-wavelength demultiplexer 2-5, such as an AWG, for port #1 through port #96, to which fixed-wavelength optical senders, 1-1 through 1-96, and fixed-wavelength optical receivers, 4-1 through 4-96, are connected; and a wavelength-nonselective (or less wavelength-dependent) 32×1 optical coupler (multiplexer) 2-6 and a 1×32 optical coupler (demultiplexer) 2-7 for port #97 through port #128, to which variable-wavelength optical senders, 1-97 through 1-128, and variable-wavelength optical receivers, 4-97 through 4-128, are connected. Outputs of the multiplexer 2-3 and the 32×1 optical coupler 2-6 are combined by the 2×2 optical coupler 2-4 and then split in power between the demultiplexer 2-5 and the 1×32 optical coupler 2-7. Further, the demultiplexer 2-5, which is wavelength selective, eliminates the necessity for wavelength selective optical filters, 3-1 through 3-96.

With this arrangement, light from the fixed-wavelength optical senders, 1-1 through 1-96, is combined by the wavelength-selective multiplexer 2-3 and then input to either one of the ports of the 2×2 optical coupler 2-4, while light from the variable-wavelength optical senders, 1-97 through 1-128, is combined by the 32×1 optical coupler 2-6 and then input to the other one of the ports of the 2×2 optical coupler 2-4. The 2×2 optical coupler 2-4 combines the incoming light from the multiplexer 2-3 and the 32×1 optical coupler 2-6 and then splits the combined light in power into the wavelength-selective demultiplexer 2-5 and the wavelength-nonselective 1×32 optical coupler 2-7.

The wavelength-selective demultiplexer 2-5 demultiplexes the input light, input from the 2×2 optical coupler 2-4, among the optical receivers, 4-1 through 4-96, for each wavelength. The wavelength-nonselective 1×32 optical coupler 2-7 splits the input light (WDM light), input from the 2×2 optical coupler 2-4, in power among the optical receivers (tunables), 4-97 through 4-128.

In other words, in the present modification, the foregoing multiplexer 2-3, 2×2 optical coupler 2-4, demultiplexer 2-5, 32×1 optical coupler 2-6, 1×32 optical coupler 2-7, and wavelength-selective optical filters, 3-97 through 3-128, in combination, form the above-mentioned optical coupling means that selects an output port depending on the above-described input wavelength.

Figure 2:
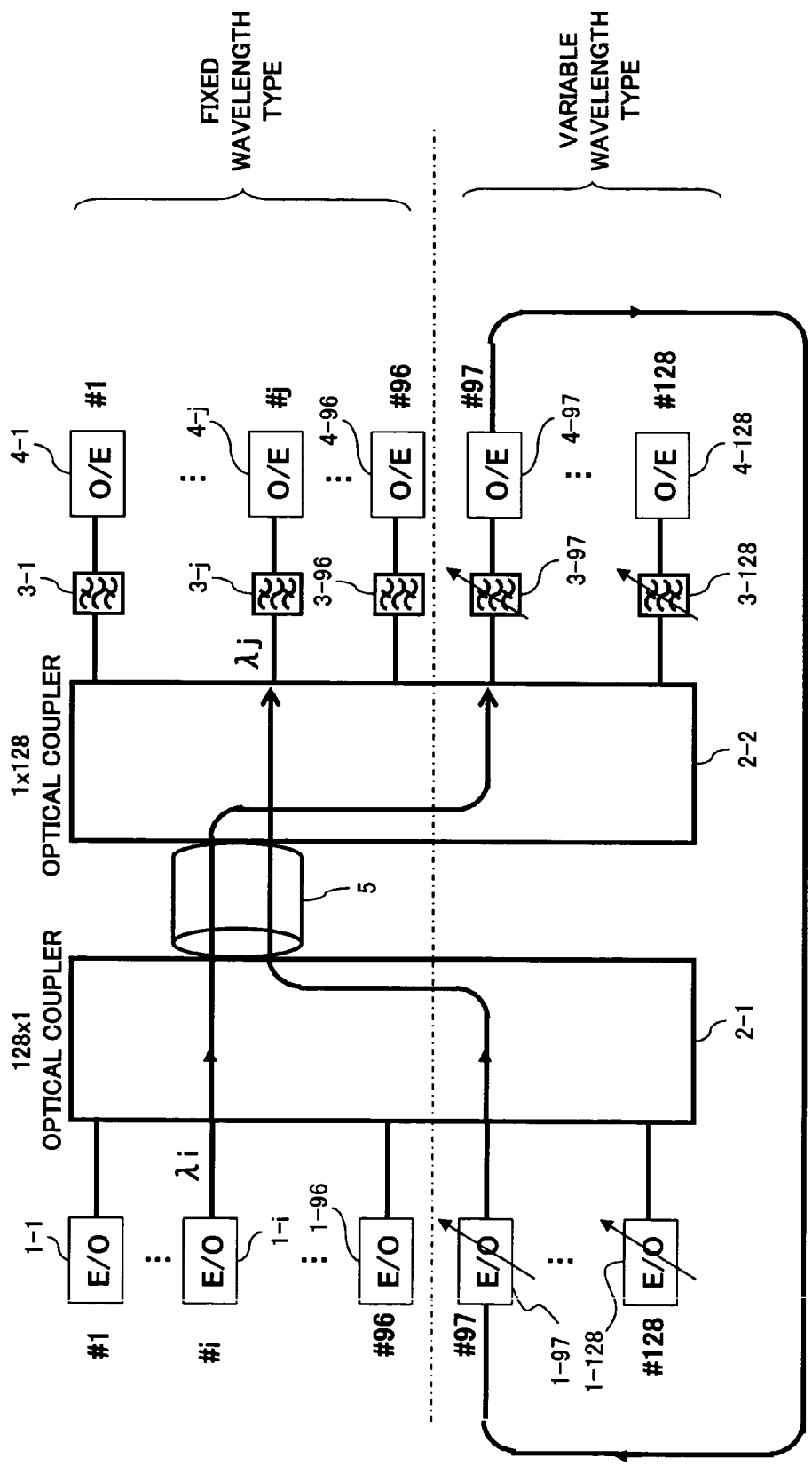
FIG. 2 is a block diagram showing a first modified example of the optical network system of FIG. 1.

With such an arrangement, as in the case of the system having been described referring to FIG. 1 and FIG. 2, it is possible to send a light signal from the optical sender 1-$i$ of the #i-th port for a wavelength of $\lambda i$ to the optical receiver 4-$j$ of the #j-th port for a wavelength of $\lambda j$. The signal flow and the interference-avoiding control are the same as those in the system of FIG. 1. Moreover, in the present modification, since a wavelength-selective multiplexer 2-3 and a wavelength-selective demultiplexer 2-5, such as an AWG, cause a lower loss than that of an optical coupler, loss in an optical path between the sender and the receiver end will be reduced in comparison with the system of FIG. 1 and FIG. 2. In particular, with an increased number of ports, such a wavelength-selective multiplexer and demultiplexer applied to the fixed-wavelength ports can reduce loss in an optical path between the sender and the receiver end, so that the optical senders and receivers no longer require such precise properties as in the system of FIG. 1 and FIG. 2.

Figure 4:
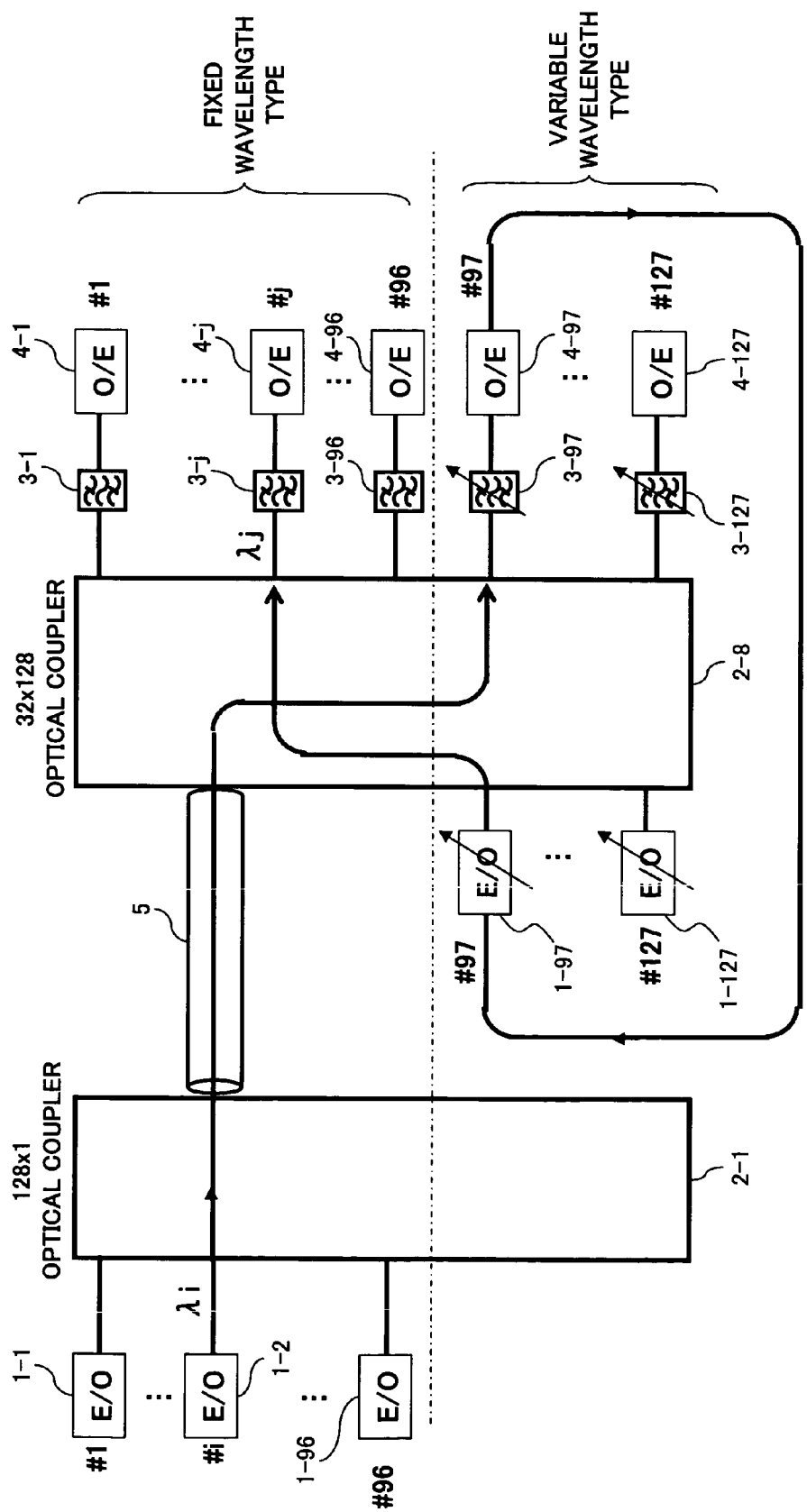
FIG. 4 is a block diagram showing a third modified example of the optical network system of FIG. 1.

(A3) Third Modification:

FIG. 4 depicts a third modified example of the optical network system already described referring to FIG. 1. The system of FIG. 4 differs from that of FIG. 1 in that, in place of a 128×128 optical coupler 2, the system employs a 128×1 optical coupler 2-1, a 32×128 optical coupler 2-8, and an optical fiber 5 connecting therebetween, and in that fixed-wavelength optical senders, 1-1 through 1-96, are connected to the 128×1 optical coupler 2-1 while variable-wavelength optical senders, 1-97 through 1-127, are connected to input ports (31 ports) of the 32×128 optical coupler 2-8. Here, like reference numbers and characters designate similar parts or elements throughout several views of the present embodiment and the conventional art, so their detailed description is omitted here.

The 128×1 optical coupler (first optical coupler) 2-1 combines outputs of the fixed-wavelength optical senders 1-1 through 1-96 (port #97 through port #128 are unused). The 32×128 optical coupler (second optical coupler) 2-8, which is connected to the output of the 128×1 optical coupler 2-1 through the optical fiber 5, combines the output of the 128×1 optical coupler 2-1 and outputs of the optical senders, 1-97 through 1-127, and then splits the combined outputs in power among the optical output ports (port #1 through port #127).

Of all the output ports of the 32×128 optical coupler 2-8, optical output ports connected to fixed-wavelength optical receivers, 4-1 through 4-96, are provided with fixed-wavelength selective optical filters, 3-1 through 3-96, and the optical output ports connected to variable-wavelength optical receivers, 4-97 through 4-127, are provided with variable-wavelength selective optical filters, 3-97 through 3-127.

Figure 10:
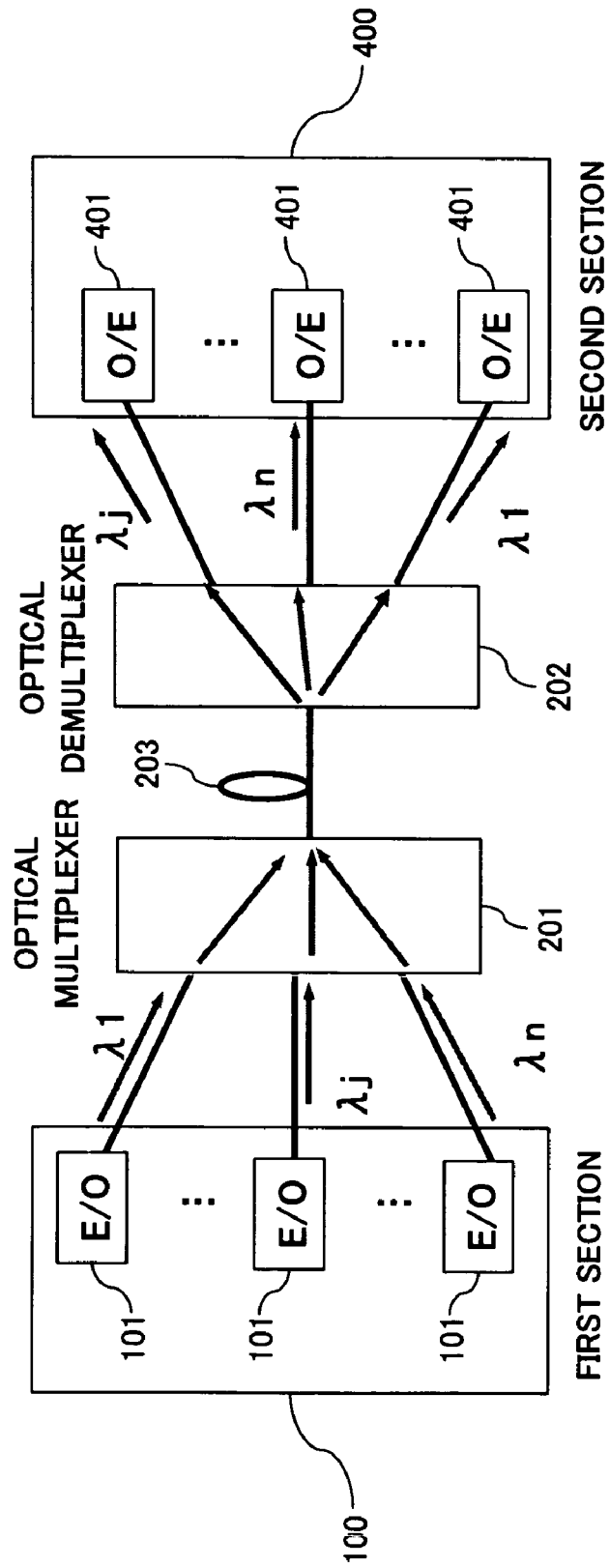
FIG. 10 is a block diagram showing a modified example of the optical network configuration of FIG. 9.
Figure 11:
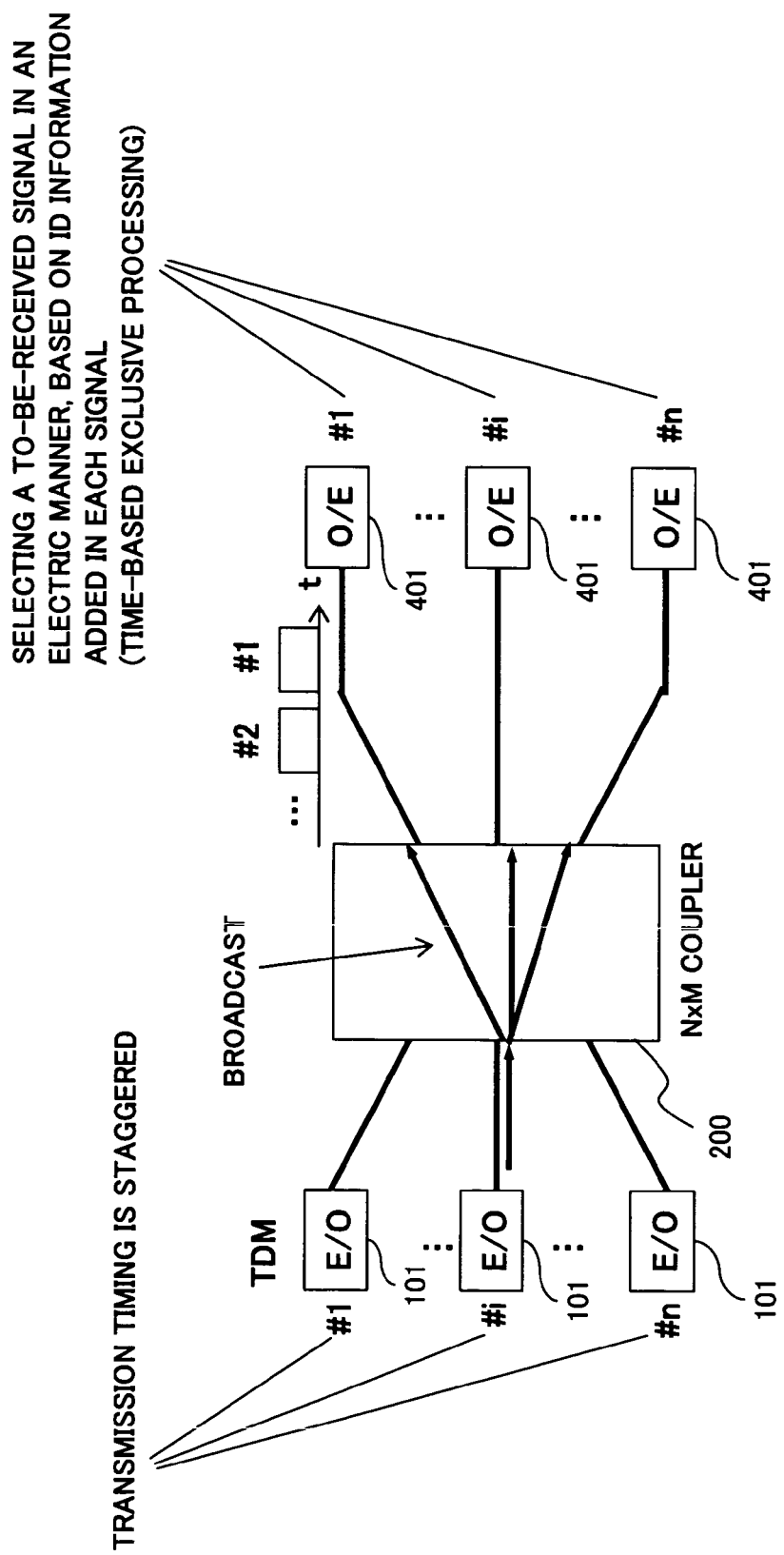
FIG. 11 is a block diagram showing an example of an optical network configuration employing a technique of adding ID information to an ordinary signal.
Figure 12:
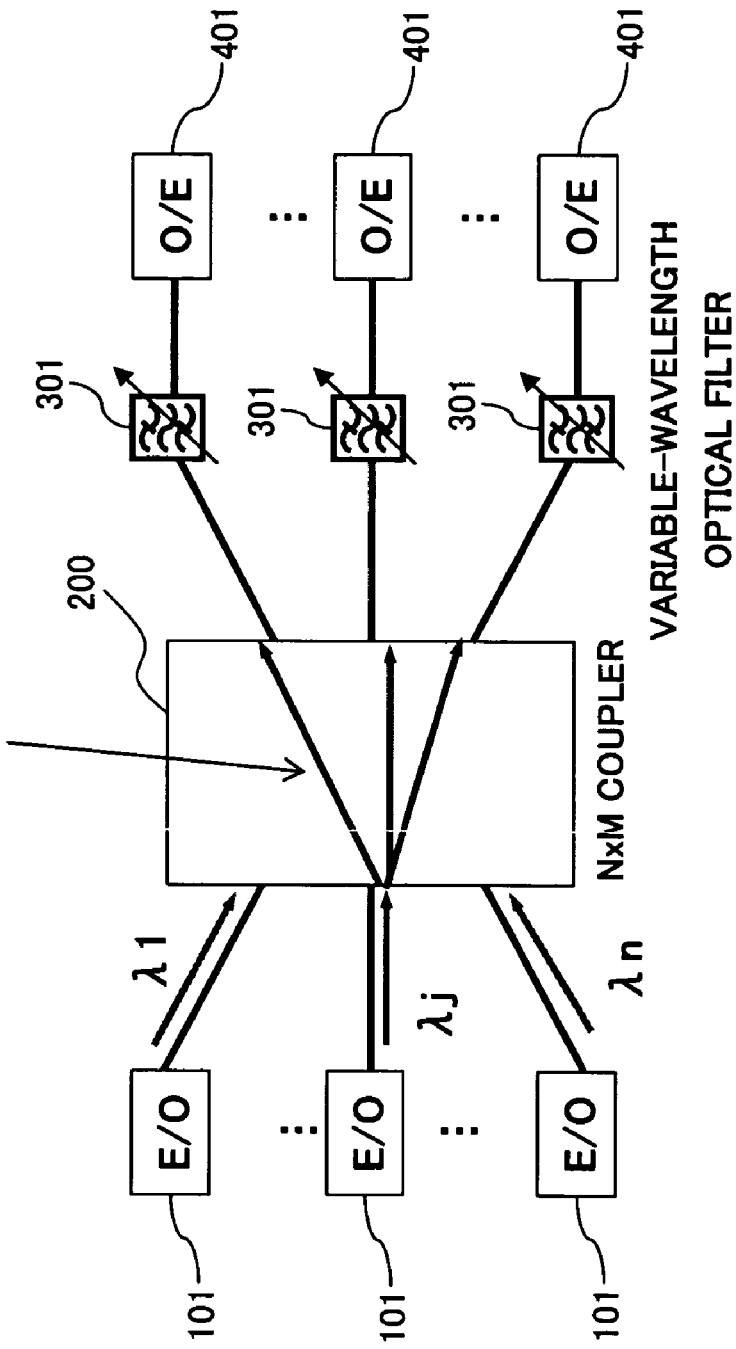
FIG. 12 is a block diagram showing an example of an optical network configuration including previous variable-wavelength optical receivers.
Figure 13:
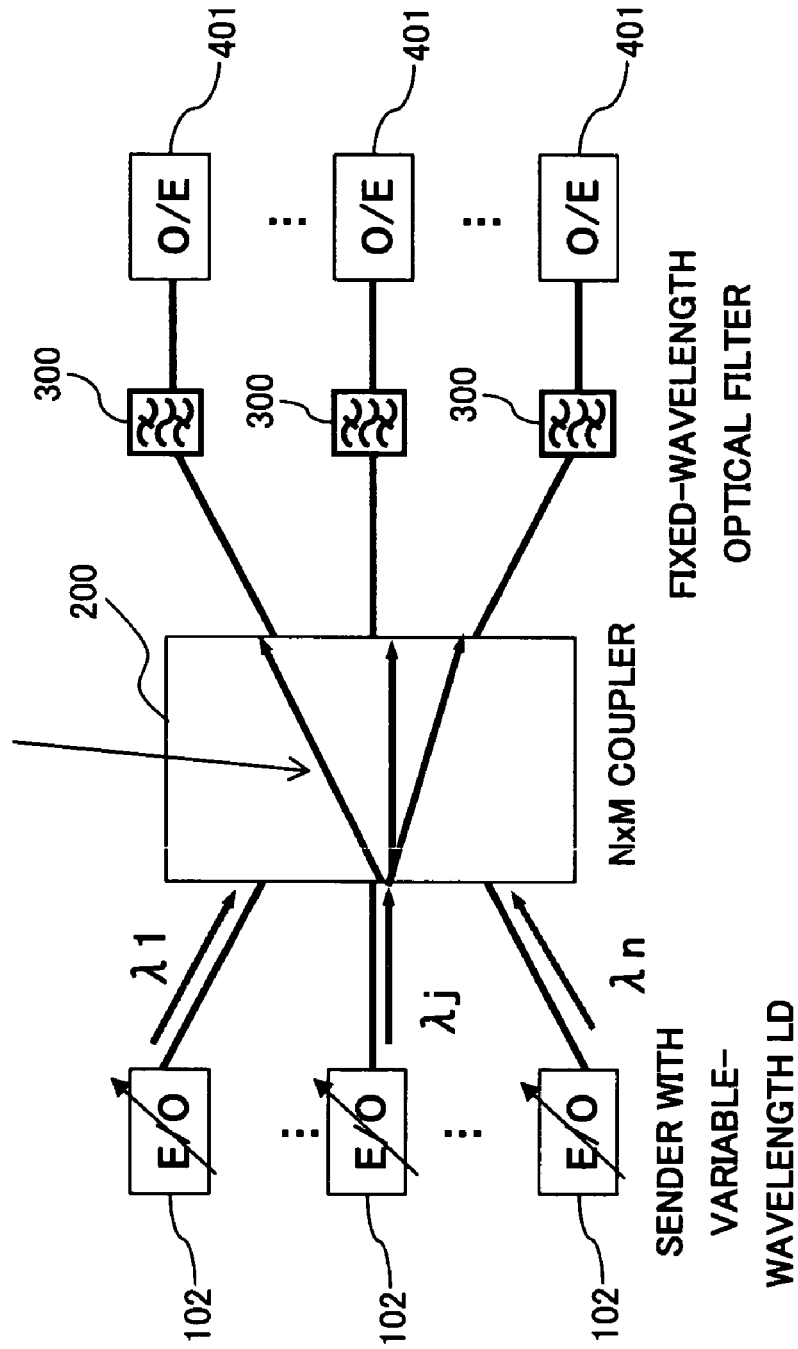
FIG. 13 is a block diagram showing an example of an optical network configuration including previous variable-wavelength optical senders.
Figure 14:
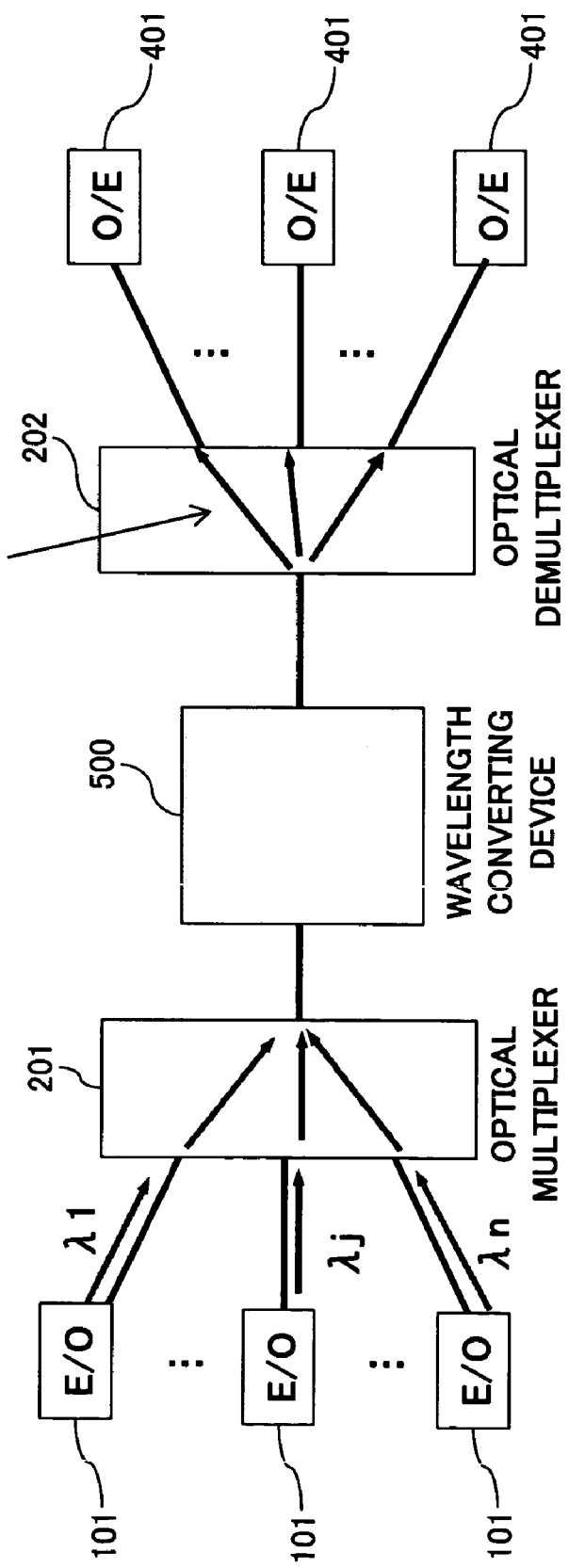
FIG. 14 is a block diagram showing an example of an optical network configuration including a previous wavelength converting device.
Figure 15:
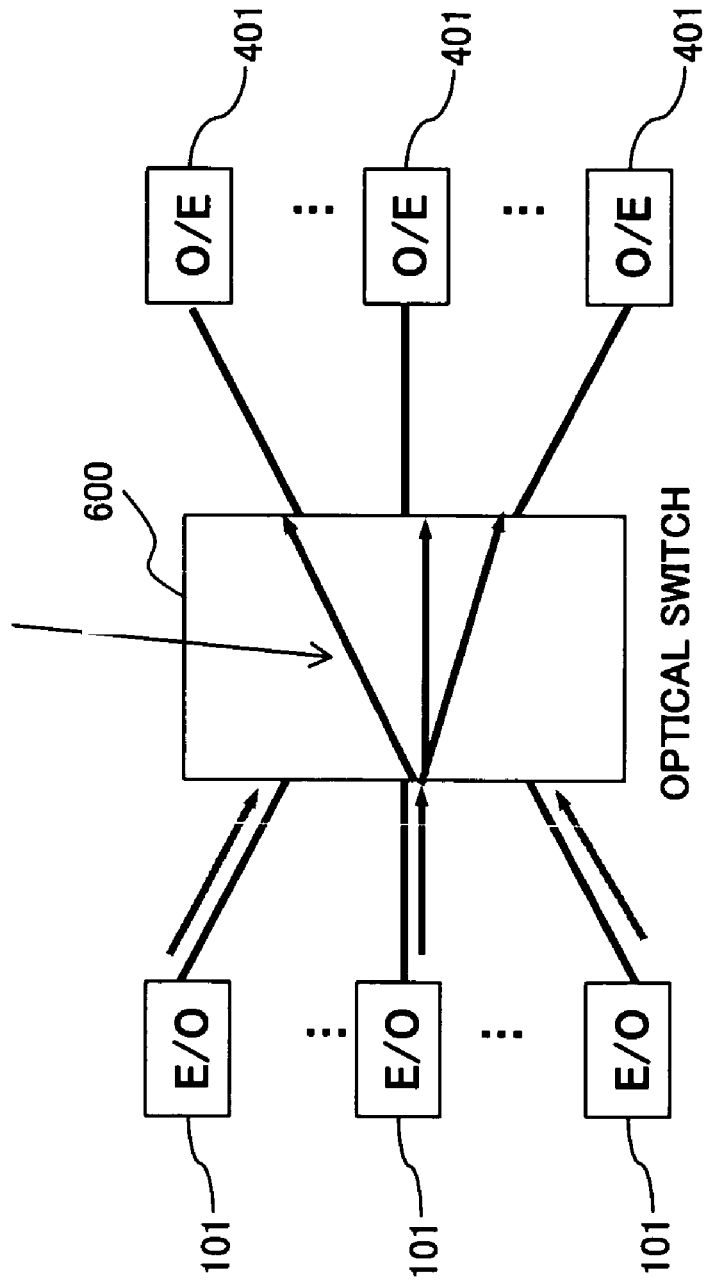
FIG. 15 is a block diagram showing an example of an optical network configuration including a previous optical switch.
Figure 16:
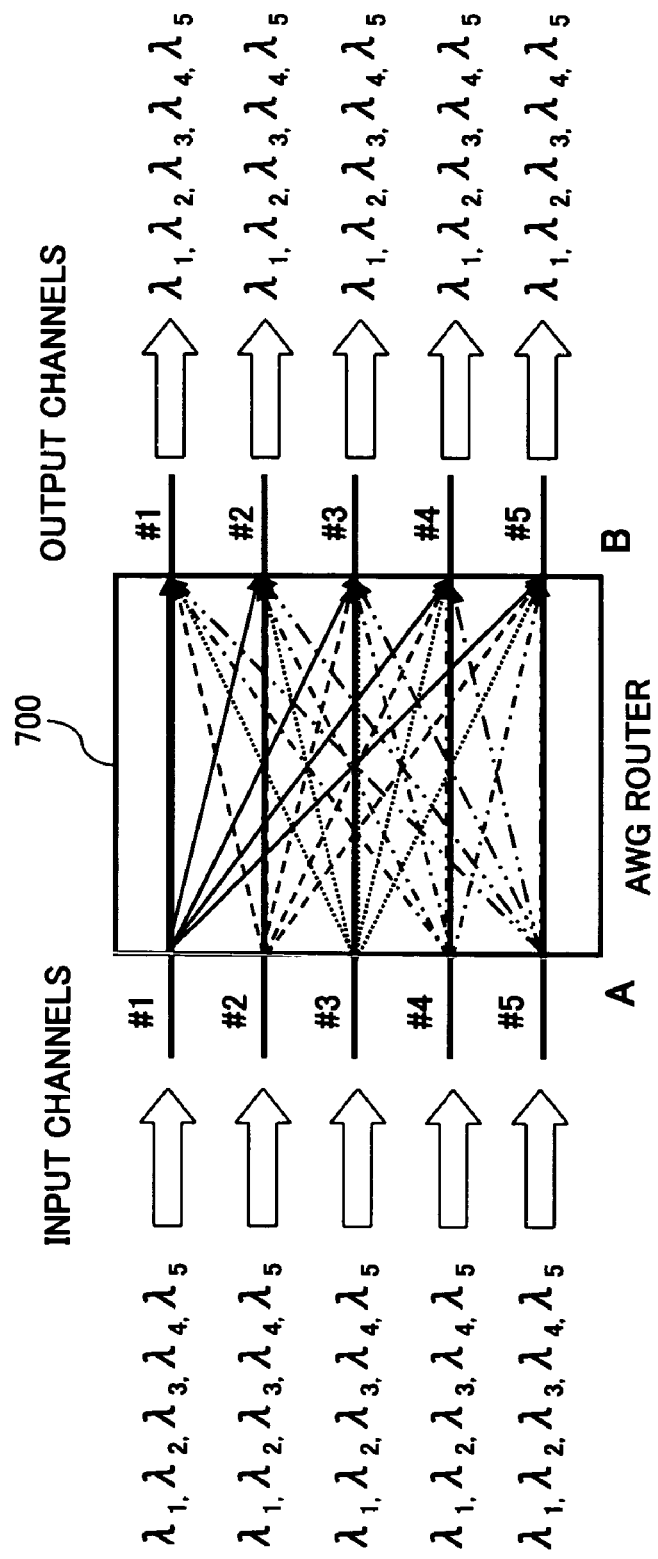
FIG. 16 is a block diagram showing an example of an optical network configuration including a continuous circulation coupler.

This arrangement is provided for the following reason. Under conditions where the distance between the optical senders, 1-1 through 1-128, and the optical receivers, 4-1 through 4-128, respectively, is relatively large (for instance, the distance between the sender and the receiver end is relatively large in the construction of FIG. 10), connecting the variable-wavelength optical senders, 1-97 through 1-127, which form a feedback system, to the input ports of the first 128×1 optical coupler 2-1, which is disposed in the vicinity of the optical senders, 1-1 through 1-96, will cause increased delay. In consideration of this, the optical senders, 1-97 through 1-128, are connected to the second input ports of the second 32×128 optical coupler 2-8, which is disposed in the vicinity of the receivers, 4-97 through 4-127.

With such an arrangement, as in the case of the system having been described referring to FIG. 1, FIG. 2, and FIG. 3, it is possible to send a light signal from the optical sender 1-$i$ of the #i-th port for a wavelength of $\lambda i$ to the optical receiver 4-$j$ of the #j-th port for a wavelength of $\lambda j$ while reducing effects of delay caused by the long distance between the sender and the receiver end. Here, the signal flow and the interference-avoiding control are the same as those in the system of FIG. 1.

Figure 5:
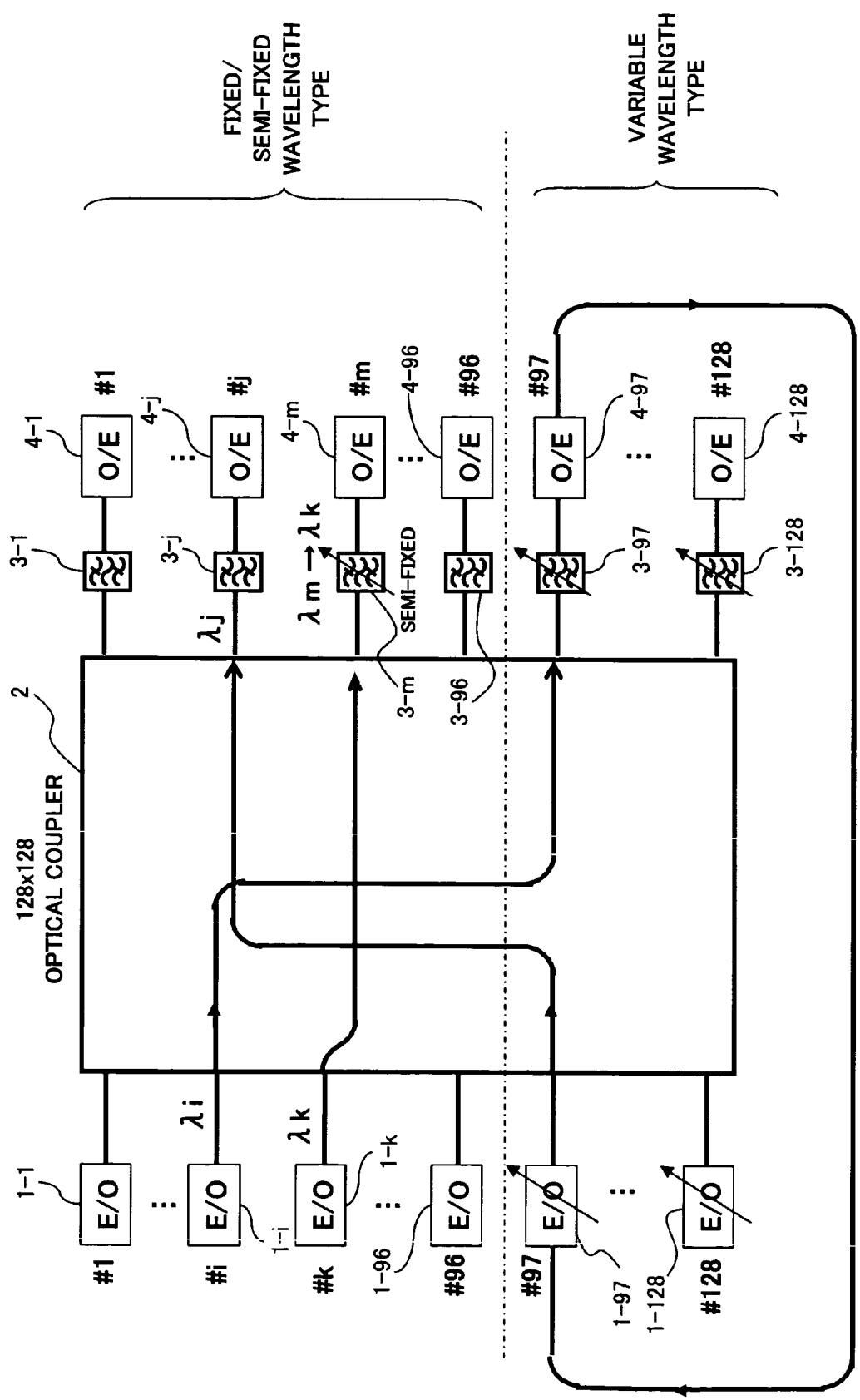
FIG. 5 is a block diagram showing a fourth modified example of the optical network system of FIG. 1.

(A4) Fourth Embodiment:

FIG. 5 depicts a fourth modified example of the optical network system already described referring to FIG. 1. The system of FIG. 5 differs from that of FIG. 1 in that the wavelength-selective optical filter 3-$m$ of the #m-th port is formed as a semi-fixed-wavelength optical filter. That is, the optical sender 1-$i$ of the #i-th port for a wavelength of $\lambda i$ is initially set so as to send a light signal to the optical receiver 4-$j$ of the #j-th port for a wavelength of $\lambda j$, and the optical sender 1-$k$ of the #k-th port for a wavelength of $\lambda k$ is initially set so as to send a light signal to the optical receiver 4-$m$ of the #m-th port for a wavelength of $\lambda m$. After that, the signal path between the optical sender 1-$k$ of the #k-th port and the optical receiver 4-$m$ of the #m-th port is changed at regular time intervals (the wavelength selected by the wavelength-selective optical filter 3-$m$ of the #m-th port is regularly switched from a wavelength of $\lambda m$ into a wavelength of $\lambda k$). Here, the signal transmit path from the optical sender 1-$i$ of the #i-th port to the optical receiver 4-$j$ of the #j-th port is similar to that of FIG. 1.

In this manner, under conditions where switching between a direct route and a feedback route is available and also where the route changing takes long time, it is preferable to use a semi-fixed-wavelength type of optical filter as the wavelength-selective optical filter 3-$m$ provided for the optical receiver 4-$m$ of the #m-th port to change in advance the central transmission wavelength of the semi-fixed-wavelength filter from a wavelength of $\lambda m$ to a wavelength of $\lambda k$, thereby fixing the path. As a result, the necessity of using a variable-wavelength optical sender 1-K and a variable-wavelength optical receiver 4-K at wavelength conversion will be eliminated (the necessity of reinputting a signal, as feedback, into the optical coupler 2 is eliminated), thereby reducing costs.

Further, some or all of the other wavelength selective optical filters, 3-1 through 3-($m$−1), 3-($m$+1) through 3-128, can also be prepared as semi-fixed-wavelength filters. At that time, path switching should not be performed so often because of semi-fixed wavelengths of the filters.

Figure 6:
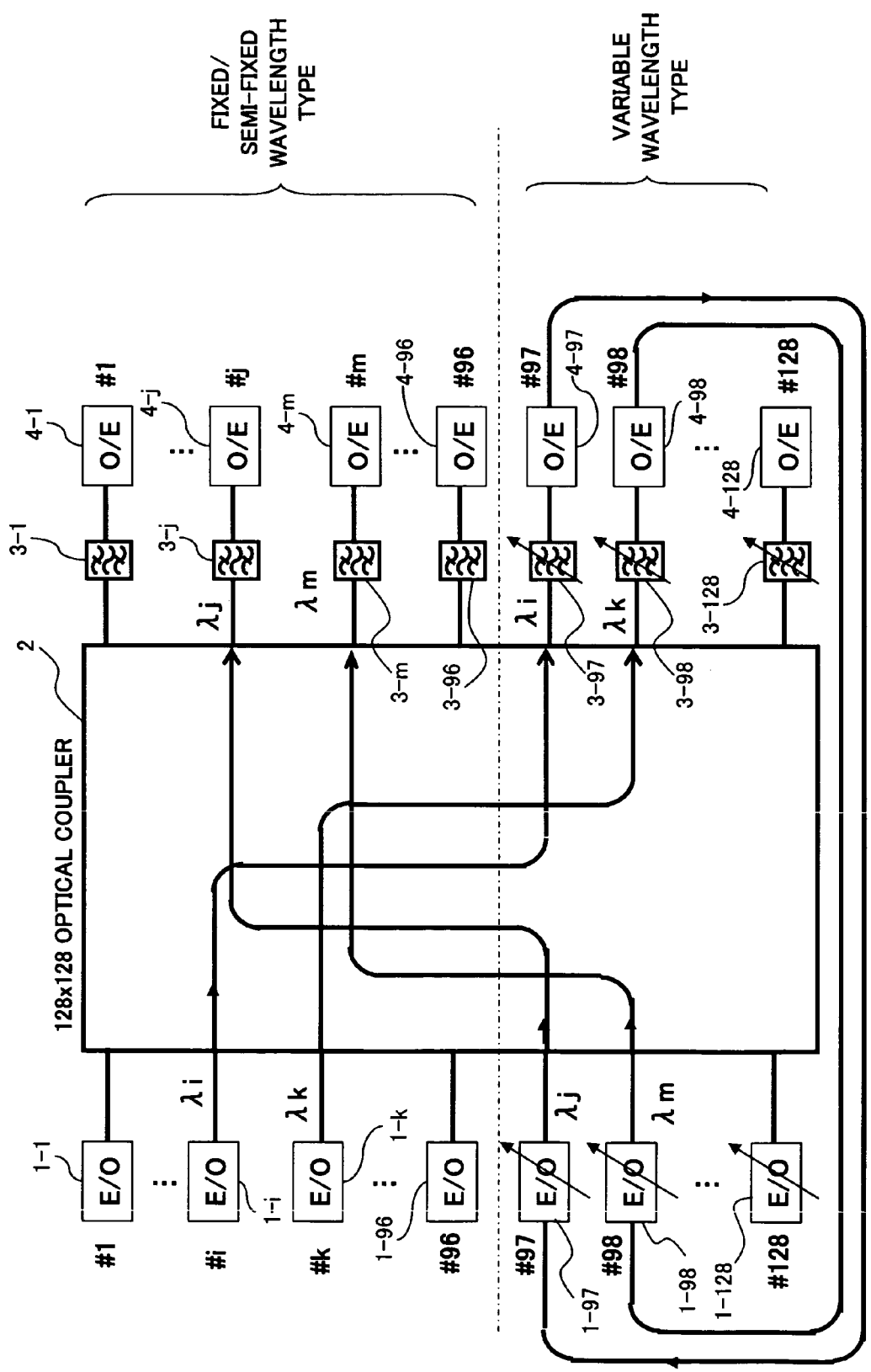
FIG. 6 is a block diagram showing a fifth modified example of the optical network system of FIG. 1.

(A5) Fifth Modification:

The above description was made, focusing attention on one port which is to send and receive a light signal. However, since the system employs the wavelength-division multiplexing technology, signals from two or more ports can be sent/received at the same time. FIG. 6 shows an example with two ports. In FIG. 6, the optical sender 1-$i$ of the #i-th port for a wavelength of $\lambda i$ sends a light signal to the optical receiver 4-$j$ of the #j-th port for a wavelength of $\lambda j$, and the optical sender 1-$k$ of the #k-th port for a wavelength of $\lambda k$ sends a light signal to the optical receiver 4-$m$ of the #m-th port for a wavelength of $\lambda m$. In this example, the optical receivers, 4-1 through 4-96 (wavelength-selective optical filters, 3-1 through 3-96), can be either of a fixed-wavelength type or a semi-fixed-wavelength type.

In this example, a light signal output from the optical sender 1-$i$ of the #i-th port is combined, in the optical coupler 2, with a light signal output from other optical senders, and then, after being split in power among the output ports of the optical coupler 2, the light is input to the optical receiver 4-97 of the #97th variable-wavelength port that is given a central transmission wavelength of $\lambda j$. After that, in the optical coupler 2, the resultant light is combined once again with light signals output from other optical senders, and then split in power among the output ports. In this manner, the light signal at a wavelength of $\lambda j$ passes through the fixed filter 3-$j$ with a central transmission wavelength of $\lambda j$ and then enters the optical receiver 4-$j$ of the #j-th port.

On the other hand, a light signal sent from the optical sender 1-$k$ of the #k-th port is combined, by the optical coupler 2, with light signals output from other optical senders and then split in power among the output ports. After that, the light enters the optical receiver 4-98 of the #98th port, which is of a variable-wavelength type with a central transmission wavelength of $\lambda k$, not the optical receiver 4-97 of the #97th port, which is of a variable-wavelength type with a central transmission wavelength of $\lambda i$. This light signal is converted into an electric signal by the optical receiver 4-98, and then fed-back to the optical sender 1-98 of the #98th port whose central wavelength is set to a wavelength of $\lambda m$. The electric signal is then converted into a light signal at a wavelength of $\lambda m$ before being reinput into the optical coupler 2.

The light signal at a wavelength of $\lambda m$ is once again combined, by the optical coupler 2, with a light signal output from other optical senders and then split in power. After that, the light signal passes through the fixed filter 3-*m* with a central transmission wavelength of λm, and then enters the optical receiver 4-*m* of the #m-th port.

In this manner, the optical sender 1-*i* of the #i-th port for a wavelength of λi sends a light signal to the optical receiver 4-*j* of the #j-th port for a wavelength of λj, and the optical sender 1-*k* of the #k-th port for a wavelength of λk sends a light signal to the optical receiver 4-*m* of the #m-th port for a wavelength of λm. In this example, the control is performed as follows. After the variable-wavelength optical sender 1-97 and optical receiver 4-97 of the #97th port are activated, the variable-wavelength optical sender 1-98 and optical receiver 4-98 of the #98th port are activated. That is, pairs of variable-wavelength optical senders 1-K and optical receivers 4-K are sequentially activated, and upon completion of information transmission, the senders and receivers are returned into a stand-by condition. In this modification, the description was made using a two-port example, but similar control can be performed with a three-port example.

Figure 7:
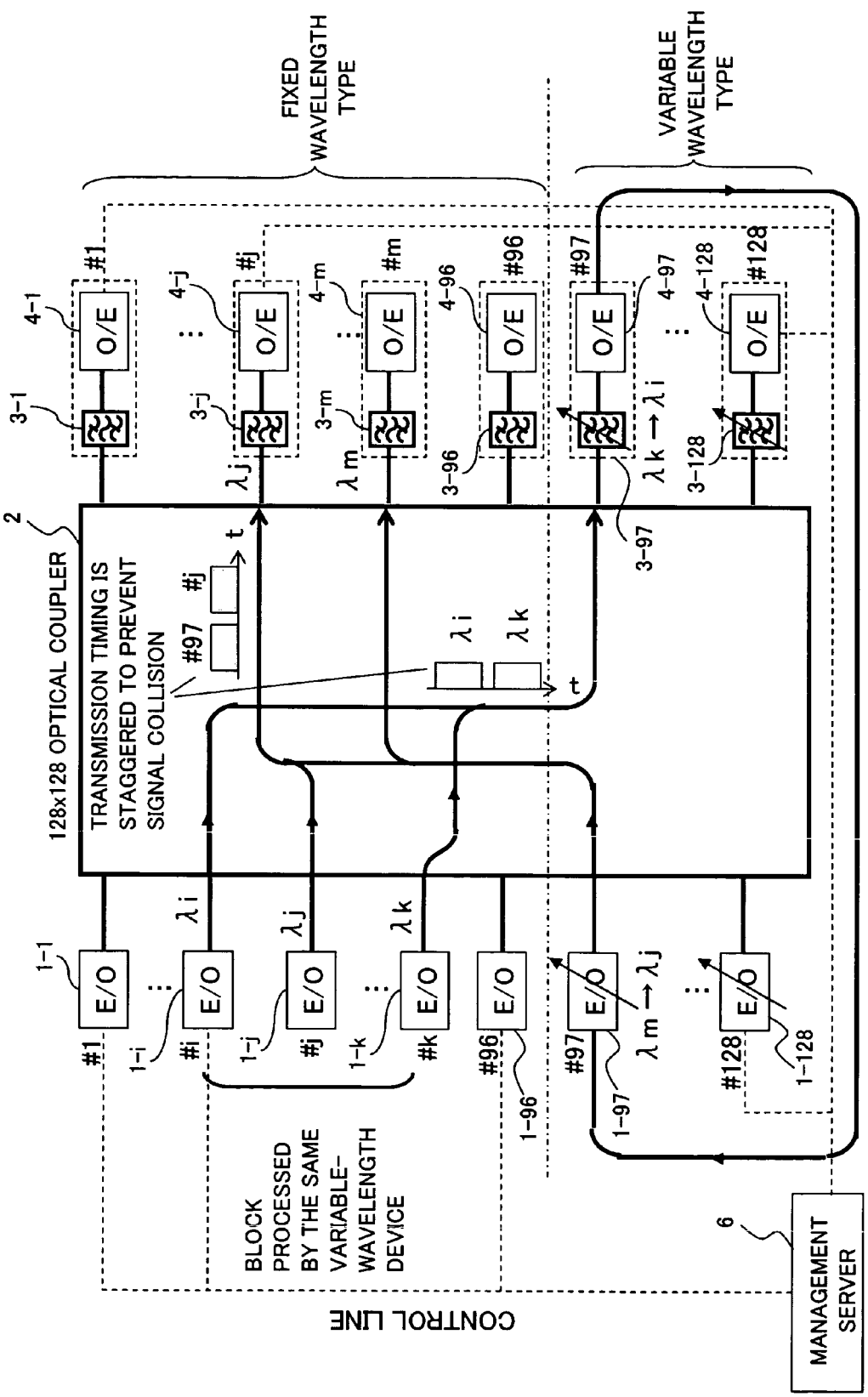
FIG. 7 is a block diagram showing a sixth modified example of the optical network system of FIG. 1.

(A6) Sixth Modification:

FIG. 7 depicts a sixth modified example of the optical network system already described referring to FIG. 1. The system of FIG. 7 has a construction such that, the system of FIG. 1 includes a management server (control means) 6 which is capable of controlling the optical senders, 1-1 through 1-128, the optical receivers, 4-1 through 4-128, and the variable-wavelength-type wavelength-selective optical filters, 3-97 through 3-128. Here, the management server 6 acknowledges the condition of information transfer in communication apparatus or information processing equipment which is equipped (connected) with the optical senders, 1-1 through 1-128, and the optical receivers, 4-1 through 4-128, and controls the above optical devices based on the information transfer condition.

Further, in FIG. 7, both a light signal from the optical sender 1-*i* of the #i-th port for a wavelength of λi and a light signal from the optical sender 1-*j* of the #j-th port for a wavelength of λi are sent to the optical receiver 4-*j* of the #j-th port for a wavelength of λj, and a light signal from the optical sender 1-*k* of the #k-th port for a wavelength of λk is sent to the optical receiver 4-*m* of the #m-th port for a wavelength of λm. In addition, in FIG. 7, the light signal from the optical sender 1-*i* of the #i-th port and the light signal from the optical sender 1-*k* of the #k-th port are converted in wavelength via the variable-wavelength optical receiver 4-97 and optical sender 1-97 of the same #97th port.

At that time, if an ample number of ports are provided for the variable-wavelength optical sender 1-K and of the variable-wavelength optical receiver 4-K (if an unused pair of variable-wavelength optical sender 1-K and an variable-wavelength optical receiver 4-K exists), wavelength conversion should be carried out via another variable-wavelength port, as has been described with reference to FIG. 6. FIG. 7 illustrates an example in which an insufficient number of variable-wavelength ports are prepared, that is, where other ports are also used so frequently—for example, when 32 (the number of ports that are assigned as variable-wavelength ports) or more wavelengths of light signals are transmitted at the same time—that wavelength conversion of two or more light signals from different optical senders 1-J needs to be performed via the same pair of optical sender 1-K and optical receiver 4-K. If any unused variable-wavelength port exists, the wavelength conversion should be performed via the unused port.

That is, in this example, (a) an optical sender 1-*i* of the #i-th port for a wavelength of λi sends a light signal to the optical receiver 4-*j* of the #j-th port which is capable of receiving a wavelength of λj; (b) the optical sender 1-*k* of the #k-th port for a wavelength of λk sends a light signal to the optical receiver 4-*m* of the #m-th port which is capable of receiving a wavelength of λm; (c) the optical sender 1-*j* of the #j-th port for a wavelength of λj sends a light signal to the optical receiver 4-*j* of the #j-th port which is capable of receiving a wavelength of λj. Under the above condition (a) or (b), wavelength conversion is performed via the optical sender 1-97 and the optical receiver 4-97 of the same #97th port.

In this manner, if the above conditions (a), (b), and (c) happen concurrently, signal collision is caused in the optical coupler 2. Thus, the management server 6 needs to perform necessary control on relevant optical senders and optical receivers so that timing of their signal transmission is staggered, so as to prevent the signal collision (so that different light signals at an identical wavelength are never input in the optical coupler 2 at the same time). Here, although only one pair of optical sender 1-97 and optical receiver 4-97 is used in wavelength conversion in FIG. 7, the present invention should by no means be limited to this.

A description will be made hereinbelow of an operation of the system (management server 6) of FIG. 7.

Light signals, if simultaneously sent out from the optical sender 1-*i* of the #i-th port and the optical sender 1-*k* of the #k-th port, cannot be received by the optical receiver 4-97 of the #97th port. Therefore, the management server 6 controls the optical senders, 1-*i* and 1-*k*, to send light signals at different timings. For instance, the optical sender 1-*k* initially sends a light signal at a wavelength of λk. At this time, the management server 6 sets the central transmission wavelength of the tunable 3-97 for the optical receiver 4-97 of the variable-wavelength-type #97th port to a wavelength of λk, and whereby the optical receiver 4-97 receives the light signal at a wavelength of λk.

In other words, the management server 6 serves as a first control section, which controls the optical senders, 1-*i* and 1-*k*, each having a transmit wavelength within a range of variable wavelengths of the optical receiver 4-97, to stagger timing with which the optical senders, 1-*i* and 1-*k*, send light signals, so that the light signals having the same wavelength are not simultaneously input to the variable-wavelength optical receiver 4-97.

The optical receiver 4-97 converts the received light signal at a wavelength of λk into an electric signal. This electric signal is fedback to the variable-wavelength optical sender 1-97 of the #97th port which is paired with the optical receiver 4-97. At this time, the management server 6 sets the central wavelength of the optical sender 1-97 to a wavelength of λm, whereby the above feedback signal is converted into a light signal at a wavelength of λm and then reinput to the optical coupler 2. The light signal at a wavelength of λm resultantly passes through the wavelength-selective optical filter 3-*m* of the #m-th port whose central transmission wavelength is λm and then received by the optical receiver 4-*m*. That is, the light signal sent from the optical sender 1-*k* of the #k-th port for a wavelength of λk is received by the optical receiver 4-*m* of the #m-th port for a wavelength of λm.

Next, the management server 6 sets the central transmission wavelength of the tunable 3-97 of the #97th port to a wavelength of λi, and controls the optical sender 1-*i* to send a light signal at a wavelength of λi. The light signal passes through the wavelength-selective optical filter 3-97 and is then received by the optical receiver 4-97, which converts the light signal into an electric signal, and after the conversion, the light signal is fedback to the optical sender 1-97. At this time, the management server 6 sets the central wavelength of the optical sender 1-97 to a wavelength of λj and halts signal transmission from the optical sender 1-*j* of the #j-th port for a wavelength of λj so as to avoid signal collision.

As a result, the foregoing feedback signal is converted into a light signal at a wavelength of λj before being reinput to the optical coupler 2. After that, the light signal passes through the wavelength-selective optical filter 3-*j* of the #j-th port and is then received by the optical receiver 4-*j*. That is, the light signal sent from the optical sender 1-*i* of the #i-th port for a wavelength of λi is received by the optical receiver 4-*j* of the #j-th port for a wavelength of λj.

After that, the management server 6 controls the optical sender 1-*j* of the #j-th port for a wavelength of λj to send a light signal at a wavelength of λj. The light signal at a wavelength of λj passes through the wavelength-selective optical filter 3-*j* of the #j-th port and is then received by the optical receiver 4-*j*.

In other words, the management server 6 serves as a second control unit, which staggers transmission timing in optical senders 1-97 and 1-*j* (including the optical sender 1-97 of a fixed-wavelength type), which send light signals at an identical wavelength of λj (the resultant wavelength obtained after wavelength conversion), so that the light signals of the same wavelength are not input to the fixed-wavelength optical receiver 4-*j* at the same time.

In this manner, under control by the management server 6, the optical sender 1-*k* of the #k-th port, the optical sender 1-1 of the #i-th port, and the optical sender 1-*j* of the #j-th port sequentially send light signals in this order. In synchronization with the transmission timing, the management server also controls the central transmission wavelength of the tunable 3-97 and the central wavelength of the optical sender 1-97 so as to perform time-division multiplexing transmission of light signals at an identical wavelength for each block, which light signals are likely to collide with each other in the optical coupler 2. As a result, each transmission light is received by its desired optical receiver without collision thereof, so that it becomes possible to realize an optical link in which p (p=32 in FIG. 7) or more pairs of variable-wavelength optical senders 1-K and variable-wavelength optical receivers 4-K are connected as a full mesh.

Note that transmission timing sequence should by no means be limited to the above, and it is also possible to change the sequence to follow any appropriate priority order.

Figure 8:
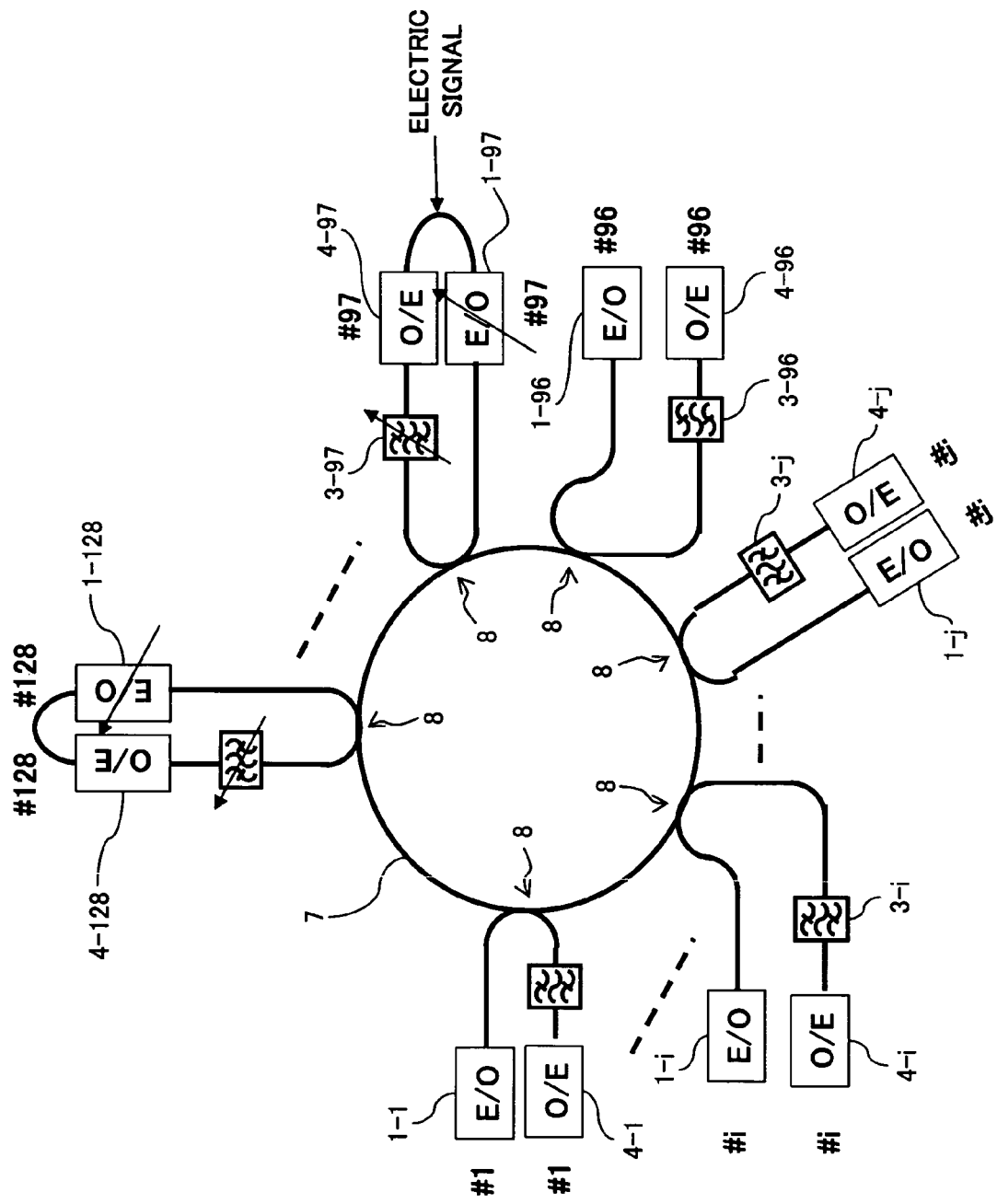
FIG. 8 is a block diagram showing a seventh modified example of the optical network system of FIG. 1.
Figure 9:
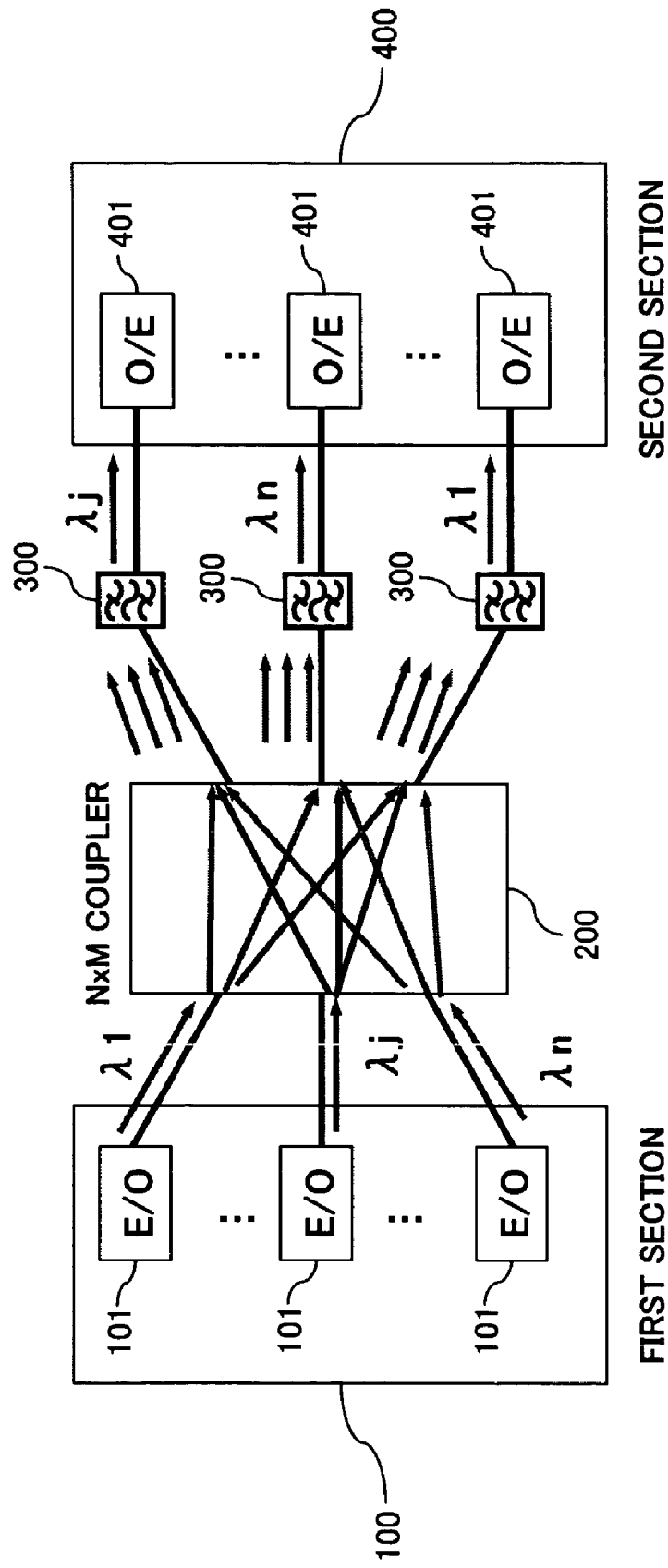
FIG. 9 is a block diagram showing an example of a previous optical network configuration (star WDM network)

(A7) Seventh Modification:

FIG. 8 depicts a seventh modified example of the optical network system already described with reference to FIG. 1. The system of FIG. 8 has a ring-shaped optical transmission path (optical fiber) 7 and a plurality of (128 in this example) optical senders, 1-1 through 1-128, and a plurality of optical receivers, 4-1 through 4-128, connected to the optical transmission path 7 via optical couplers 8. A light signal sent from an individual optical sender, 1-1 through 1-128, is multiplexed with WDM signals transmitted through the optical transmission path 7, and the WDM signals are then split in power by the optical couplers 8 into the corresponding optical receivers, 4-1 through 4-128.

In the present example, also, some (a total of 32), 1-97 through 1-128, of the optical senders, 1-1 through 1-128, are of a variable transmit wavelength type, whereas the remaining 96 optical senders, 1-1 through 1-96, are of a fixed transmit wavelength type. Likewise, some (a total of 32), 3-97 through 3-128, of the wavelength-selective optical filters, 3-1 through 3-128, are of a variable wavelength type, whereas the remaining 96 wavelength-selective optical filters, 3-1 through 3-96, are of a fixed wavelength type. Further, some (a total of 32), 4-97 through 4-128, of the optical receivers, 4-1 through 4-128, are of a variable-wavelength type, whereas the remaining 96 optical receivers, 4-1 through 4-96, are of a fixed receive wavelength type, and the 32 variable-wavelength optical receivers, 4-97 through 4-128, are connected, one to each of the 32 variable-wavelength optical senders, 1-97 through 1-128.

In the above-described ring-type network system, assuming that the optical sender 1-*i* of the #i-th port for a wavelength of λi sends a light signal to the optical receiver 4-*j* of the #j-th port for a wavelength of λj, the light signal at a wavelength of λi output from the optical sender 1-*i* of the #i-th port is multiplexed, by the corresponding optical coupler 8, with light signals output from other optical senders, and then split in power by other optical couplers 8.

Here, if the central transmission wavelength of the tunable optical filter 3-97 of the #97th port is set to a wavelength of λi, the light signal at a wavelength of λi sent from the optical sender 1-*i* passes through the tunable 3-97 to be received by the optical receiver 4-97. After that, the light signal is converted into an electric signal by the optical receiver 4-97 and then sent (fedback) to the optical sender 1-97 of the variable-wavelength-type #97th port whose central wavelength has been set to a wavelength of λj.

As a result, the electric signal is converted into a light signal at a wavelength of λj by the optical sender 1-97 and then multiplexed, by the corresponding optical coupler 8, with WDM signals transmitted over the optical transmission path 7. After that, the light signal at a wavelength of λj passes through the fixed filter 3-*j* with a central transmission wavelength of λj and is then received by the optical receiver 4-*j* of the #j-th port. In this manner, a light signal is transmitted from the optical sender 1-*i* of the #i-th port for a fixed wavelength of λi to the optical receiver 4-*j* of the #j-th port for a fixed wavelength of λj.

As described above, the above preferred embodiment of the present invention makes it possible to establish p optical links (p=32 in FIG. 1 through FIG. 3) as a full mesh, one optical link for each pair of variable-wavelength optical sender and variable-wavelength optical receiver. As has already been described with reference to FIG. 7, the control for staggering transmission timing, which is performed to prevent signal collision, can realize even more efficient network configuration. Here, it is not required to perform such timing control for every wavelength, but it is only required to process signal blocks that are expected to cause signal collision with staggered timing.

[B] Other Modifications

The present invention should by no means be limited to the above embodiment and its modifications, and various changes or modifications may be suggested without departing from the gist of the invention.

For example, though a star and a ring network are used in the above embodiment for description, a bus network can also be employed to realize a network construction similar to the above, and like effects and benefits to those of the above embodiment can also be realized with this modification.

Further, wavelength conversion, which is performed by variable-wavelength optical sender 1-K in the above embodiment, can be carried out by variable-wavelength optical receiver 4-K, thereby realizing like effects and benefits to those of the above embodiment. In addition, port #97 through port #128, out of port #1 through port #128, are given as variable-wavelength ports in the above embodiment, and such port arrangement can be varied as necessary.

Furthermore, feedback from optical receiver 4-K to optical sender 1-K is performed by electric signal in the above embodiment, but the feedback can also be performed by light signal with an optical fiber connecting the variable-wavelength optical receiver 4-K and the variable-wavelength optical sender 1-K. This arrangement will minimize effects of delay caused by a long distance between the variable-wavelength optical sender 1-K and the variable-wavelength optical receiver 4-K. In such a case, both or either of the variable-wavelength optical receiver 4-K and the variable-wavelength optical sender 1-K need to have an optical/electrical/optical (O/E/o) conversion function.

The present invention makes it possible to select and change the destination (optical link setting) of a light signal in a flexible manner, by preparing not all but some of the optical senders and receivers at the individual optical input and output ports as those of a variable-wavelength type, so that a full-mesh type of optical network system with a simple construction is realized at low cost. Therefore, the present invention is considered to be greatly useful in the field of optical communication technologies.

What is claimed is:

1. An optical network system, comprising:
   a plurality of optical senders including one or more fixed-wavelength optical senders each outputting light having a fixed-wavelength different from other of said plurality of optical senders and one or more variable-wavelength optical senders;
   optical coupling means having a plurality of optical input ports, to each of which light is input from one of said optical senders, and a plurality of optical output ports, from each of which light is output to one of said optical receivers, said optical coupling means for coupling light from said plurality of optical senders and outputting a coupled light from each of the plurality of optical output ports; a plurality of optical receivers including one or more fixed-wavelength optical receivers inputting light from one of the optical output ports and receiving light of a fixed-wavelength different from each other and one or more variable-wavelength optical receivers; and
   control means which controls transmission timing in said optical senders in such a manner that light at an identical wavelength is not simultaneously input from different ones of said optical senders to said optical coupling means, wherein:
      a combination of both one of said variable-wavelength optical receivers and one of said variable-wavelength optical senders converting such input light, input to one of the optical input ports, into light of a reception wavelength receivable by one of said fixed-wavelength optical receivers and reinputting the light at said reception wavelength to said optical coupling means,
      each variable-wavelength optical receiver inputs light from one of the optical output ports and receives light of a wavelength variably-tuned among wavelengths of light and outputs a signal based on the received light,
      each variable-wavelength optical sender inputs the signal from one of the variable wavelength optical receivers and outputs light of a wavelength variably-tuned among wavelengths received by said fixed-wavelength optical receivers to the optical input port, and
      said control means staggers transmission timing for two or more of said optical senders, including one of said variable-wavelength optical senders, so that light at an identical wavelength is not simultaneously input from said fixed-wavelength optical sender and said variable-wavelength optical sender to said fixed wavelength optical receiver.

2. An optical network system as set forth in claim 1, wherein said variable-wavelength optical receiver converts the received light into an electric signal and inputs the electric signal to said variable-wavelength optical sender, which converts the electric signal into light at said reception wavelength and reinputs the last-named light into said optical coupling means.

3. An optical network system as set forth in claim 1, wherein said optical coupling means includes:
   a single n×m optical coupler, n being the number of the optical input ports, and m being the number of the output ports;
   a fixed-wavelength selector provided for each of the optical output ports, of the optical output ports of said optical coupler, connected to said fixed-wavelength optical receivers, said fixed-wavelength selector selecting a wavelength of light which is to be received by each said fixed-wavelength optical receiver; and
   a variable-wavelength selector provided for each of the optical output ports, of the optical output ports of said optical coupler, connected to said variable-wavelength optical receivers, said variable-wavelength selector selecting a wavelength of light which is to be received by each said variable-wavelength optical receiver.

4. An optical network system as set forth in claim 1, wherein said optical coupling means includes:
   a first optical coupler, which is an n×1 optical coupler, n being the number of the optical input ports;
   a second optical coupler, which is a 1×m optical coupler, m being the number of the optical output ports;
   a fixed-wavelength selector provided for each of the optical output ports, of the optical output ports of said second optical coupler, connected to said fixed-wavelength optical receivers, said fixed-wavelength selector selecting a wavelength of light which is to be received by each said fixed-wavelength optical receiver; and
   a variable-wavelength selector provided for each of the optical output ports, of the optical output ports of said second optical coupler, connected to said variable-wavelength optical receivers, said variable-wavelength selector selecting a wavelength of light which is to be received by each said variable-wavelength optical receiver.

5. An optical network system as set forth in claim 4, wherein an optical amplifier is interposed between said first and said second optical coupler.

6. An optical network system as set forth in claim 1, wherein said optical coupling means includes:
   a wavelength-selective optical multiplexer for multiplexing light transmitted from said fixed-wavelength optical senders;
   a wavelength-selective optical demultiplexer for splitting the light among said fixed-wavelength optical receivers for each wavelength;
   a wavelength-nonselective optical combiner for combining light transmitted from said variable-wavelength optical senders;
   a wavelength-nonselective optical splitter for splitting the light among said variable-wavelength optical receivers;
   an optical coupler for combining outputs of said wavelength-selective optical multiplexer and said wavelength-nonselective optical combiner and splitting the outputs into said wavelength-selective optical demultiplexer and said wavelength-nonselective optical splitter; and a variable-wavelength selector for selecting, from an output of said wavelength-nonselective optical splitter, a wavelength of light which is to be received by each said variable-wavelength optical receiver.

7. An optical network system as set forth in claim 1, wherein said optical coupling means includes:

a first optical coupler for combining outputs of said fixed-wavelength optical senders;

a second optical coupler for combining an output of said first optical coupler and outputs of said variable-wavelength optical senders and splitting the combined outputs among the optical output ports;

a fixed-wavelength selector provided for each of the optical output ports, of the optical output ports of said second optical coupler, connected to said fixed-wavelength optical receivers, said fixed-wavelength selector selecting a wavelength of light which is to be received by each said fixed-wavelength optical receiver; and a variable-wavelength selector provided for each of the optical output ports, of the optical output ports of said second optical coupler, connected to said variable-wavelength optical receivers, said variable-wavelength selector selecting a wavelength of light which is to be received by each said variable-wavelength optical receiver.

8. An optical network system as set forth in claim 1, wherein said control means includes a first control unit which staggers transmission timing for two or more of said optical senders so that light at an identical wavelength is not simultaneously input from said two or more optical senders to one of said variable-wavelength optical receivers, said two or more optical senders each having a transmit wavelength within a range of variable wavelengths of the last-named variable-wavelength optical receiver.

9. An optical network system as set forth in claim 8, wherein said control means includes a second control unit which staggers transmission timing for two or more of said optical senders, including said variable-wavelength optical sender, so that light at an identical wavelength is not simultaneously input from said two or more optical senders to said fixed-wavelength optical receiver, said two or more optical senders each having a transmit wavelength equal to said reception wavelength.

10. An optical coupling apparatus used in an optical network system which is comprised of a plurality of optical senders including one or more fixed-wavelength optical senders each outputting light having a fixed-wavelength different from other of said plurality of optical senders and one or more variable-wavelength optical senders, a plurality of optical receivers, where said optical coupling apparatus is disposed between said optical senders and said optical receivers, said optical coupling apparatus comprising:

optical coupling means having a plurality of optical input ports, to each of which light is input from one of said optical senders, and a plurality of optical output ports, from each of which light is output to one of said optical receivers, said optical coupling means for coupling light from said plurality of optical senders and outputting a coupled light from each of the plurality of optical ports;

the plurality of optical receivers including one or more fixed-wavelength optical receivers inputting light from one of the optical output ports and receiving light of a fixed-wavelength different from each other and one or more variable-wavelength optical receivers; and wavelength converting and reinputting means which converts light, passing through one of the optical input ports and one of the output ports, into light of a reception wavelength receivable by one of said fixed-wavelength optical receivers and reinputs the light at said reception wavelength to said optical coupling means; and control means which controls transmission timing in said optical senders in such a manner that light at an identical wavelength is not simultaneously input from different ones of said optical senders to said optical coupling means, wherein:

said wavelength converting and reinputting means is a combination of both one of said variable-wavelength optical senders and one of said variable-wavelength optical receivers, each variable-wavelength optical receiver inputs light from one of the optical output ports and receives light of a wavelength variably-tuned among wavelengths of light and outputs a signal based on the received light, each variable wave-length optical sender inputs the signal from one of the variable wavelength optical receivers and outputs light of a wavelength variably-tuned among wavelengths received by said fixed-wavelength optical receivers to the optical input port, and said control means staggers transmission timing for two or more of said optical senders, including one of said variable-wavelength optical senders, so that light at an identical wavelength is not simultaneously input from said fixed-wavelength optical sender and said variable-wavelength optical sender to said fixed-wavelength optical receiver.

11. An optical coupling apparatus as set forth in claim 10, wherein said wavelength converting and reinputting means is so formed as that a variable-wavelength optical receiver converts received light into an electric signal and inputs the electric signal to a variable-wavelength optical sender, which converts the electric signal into light at said reception wavelength and reinputs the last-named light into said optical coupling means.

12. An optical coupling apparatus as set forth in claim 10, wherein said wavelength converting and reinputting means includes:

a single n×m optical coupler, n being the number of the optical input ports, and m being the number of the output ports;

a fixed-wavelength selector provided for each of the optical output ports, of the optical output ports of said optical coupler, connected to fixed-wavelength optical receivers, said fixed-wavelength selector selecting a wavelength of light which is to be received by each of the fixed-wavelength optical receivers;

a variable-wavelength selector provided for each of the optical output ports, of the optical output ports of said optical coupler, connected to variable-wavelength optical receivers, said variable-wavelength selector selecting a wavelength of light which is to be received by each of the variable-wavelength optical receivers.

13. An apparatus, comprising:

a plurality of optical senders including one or more fixed-wavelength optical senders each outputting light having a fixed-wavelength different from other of said plurality of optical senders and one or more variable-wavelength optical senders;

an optical coupling unit having a plurality of input ports and output ports, the optical coupling unit receiving input light at a predetermined wavelength from one of the plurality of fixed-wavelength optical senders at a respective input port of the optical coupling unit, said optical coupling unit coupling light from said plurality of optical senders and outputting a coupled light from each of the plurality of optical output ports;

a plurality of optical receivers including one or more fixed-wavelength optical receivers inputting light from one of the optical output ports and receiving light of a fixed-wavelength different from each other and one or more variable-wavelength optical receivers; and control means which controls transmission timing in said optical senders in such a manner that light at an identical wavelength is not simultaneously input from different ones of said optical senders to said optical coupling means, wherein:

a combination of both one of said variable-wavelength optical receivers and one of said variable-wavelength optical senders converting such input light, input to one of the optical input ports, into light of a reception wavelength receivable by one of said fixed-wavelength optical receivers and reinputting the light at said reception wavelength to said optical coupling unit, each variable-wavelength optical receiver inputs light from one of the optical output ports and receives light of a wavelength variably-tuned among wavelengths of light and outputs a signal based on the received light, each variable-wavelength optical sender inputs the signal from one of the variable wavelength optical receivers and outputs light of a wavelength variably-tuned among wavelengths received by said fixed-wavelength optical receivers to the optical input port, and said control means staggers transmission timing for two or more of said optical senders, including one of said variable-wavelength optical senders, so that light at an identical wavelength is not simultaneously input from said fixed-wavelength optical sender and said variable-wavelength optical sender to said fixed wavelength optical receiver.

* * * * *

UNITED STATES PATENT AND TRADEMARK OFFICE
CERTIFICATE OF CORRECTION

| | | |
|---|---|---|
| PATENT NO. | : 7,577,361 B2 | Page 1 of 1 |
| APPLICATION NO. | : 10/914192 | |
| DATED | : August 18, 2009 | |
| INVENTOR(S) | : Toshiki Tanaka et al. | |

It is certified that error appears in the above-identified patent and that said Letters Patent is hereby corrected as shown below:

Column 20, Line 21, change "variable wave-length" to --variable-wavelength--.

Signed and Sealed this

Seventeenth Day of November, 2009

David J. Kappos
*Director of the United States Patent and Trademark Office*